United States Patent [19]

Berni

[11] Patent Number: 5,327,216
[45] Date of Patent: Jul. 5, 1994

[54] APPARATUS FOR REMOTE SEISMIC SENSING OF ARRAY SIGNALS USING SIDE-BY-SIDE RETROREFLECTORS

[75] Inventor: Albert J. Berni, Houston, Tex.

[73] Assignee: Shell Oil Company, Houston, Tex.

[21] Appl. No.: 946,736

[22] Filed: Sep. 18, 1992

[51] Int. Cl.$^5$ .............................................. G01B 9/02
[52] U.S. Cl. ..................................... 356/351; 356/72; 356/349; 367/14; 73/800; 181/112; 181/122
[58] Field of Search .................. 356/72, 349, 351, 364; 367/14, 15, 20, 32, 36, 37; 73/624, 627, 628, 767, 784, 800; 181/112, 122

[56] References Cited

U.S. PATENT DOCUMENTS

| | | |
|---|---|---|
| 3,656,853 | 4/1972 | Bagley et al. |
| 4,284,350 | 8/1981 | Coon et al. |
| 4,353,650 | 10/1982 | Sommargren |
| 4,456,339 | 6/1984 | Sommargren |
| 4,594,003 | 6/1986 | Sommargren |
| 4,606,638 | 8/1986 | Sommargren |
| 4,687,958 | 8/1987 | Sommargren |
| 4,688,940 | 8/1987 | Sommargren et al. |
| 4,746,216 | 5/1988 | Sommargren |
| 4,802,763 | 2/1989 | Young et al. |
| 4,818,100 | 4/1989 | Breen |
| 4,834,111 | 5/1989 | Khanna et al. |
| 4,859,066 | 8/1989 | Sommargren |
| 4,950,078 | 8/1990 | Sommargren |
| 5,070,483 | 12/1991 | Berni |
| 5,109,362 | 4/1991 | Berni |

FOREIGN PATENT DOCUMENTS

| | | |
|---|---|---|
| WO91/13373 | 9/1991 | PCT Int'l Appl. |
| 1173772 | 12/1969 | United Kingdom |
| 1513249 | 6/1978 | United Kingdom |
| 1605217 | 8/1984 | United Kingdom |
| 2173064 | 10/1986 | United Kingdom |
| 2183956 | 6/1987 | United Kingdom |

*Primary Examiner*—Davis L. Willis
*Assistant Examiner*—LaCharles P. Keesee
*Attorney, Agent, or Firm*—Fred S. Reynolds

[57] ABSTRACT

A remote seismic sensing system is provided which operates as a bipolarized, differential mode, LDI (laser differential interferometry) system to detect electrical signals produced at a remote location. In preferred embodiments, the system is used in seismic surveying to detect array signals. An amplified array signal (the electrical signal is coupled to an array retroreflector apparatus (target). The array signal is obtained from an array of seismic detectors, e.g., geophones or hydrophones. The amplified array signal increases the velocity of a Doppler shifting optical component on the target. The target converts a defused sensing beam into two polarized return sensing signals, both of the return sensing signals having been Doppler shifted by the target to contain frequency components that represent motions, e.g., ground motions and wind motions, that are common to both signals and to contain a difference signal which represents the array signal. The difference signal has a greater deviation from the optical carrier frequency due to the amplification of the signal than the Doppler shifts imposed by the common motions. The return sensing signals are detected by a receiver and combined by electronic and/or by optical heterodyning techniques to cancel any common mode signals on the return sensing signals, thereby leaving a frequency modulated difference signal which, ideally, represents only the frequency modulated array signal. However, the difference signal may also contain turbulent noise due to atmospheric turbulence that causes frequency fluctuations on the sensing beams and the return signals. However, these frequency fluctuations will be much less than the Doppler shifts caused by the amplified signal. The frequency modulated difference signal may then be demodulated to produce a time varying signal which represents the seismic trace of the seismic motions detected by the seismic detectors of the array.

38 Claims, 6 Drawing Sheets

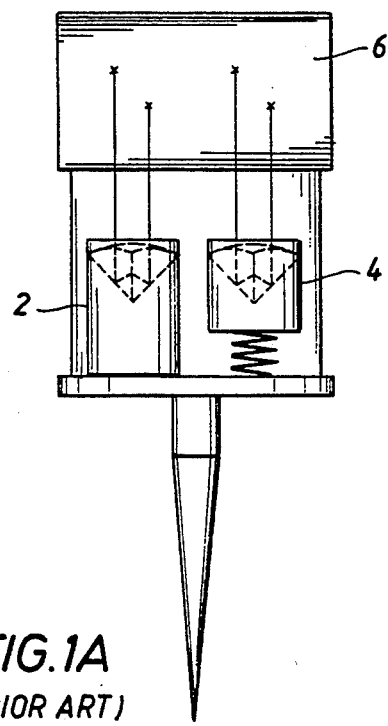
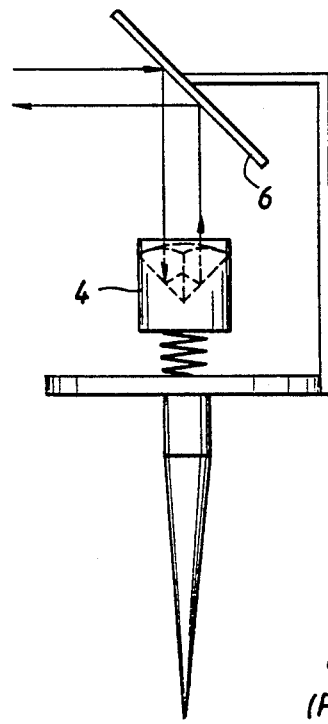
FIG.1A
(PRIOR ART)
FIG.1B
(PRIOR ART)
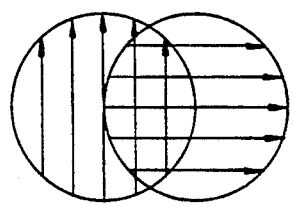
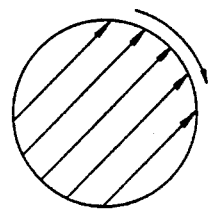
FIG.4A
FIG.4B
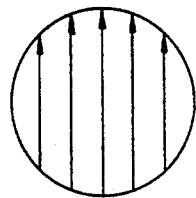
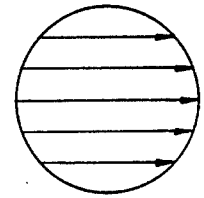
FIG.4C
FIG.4D

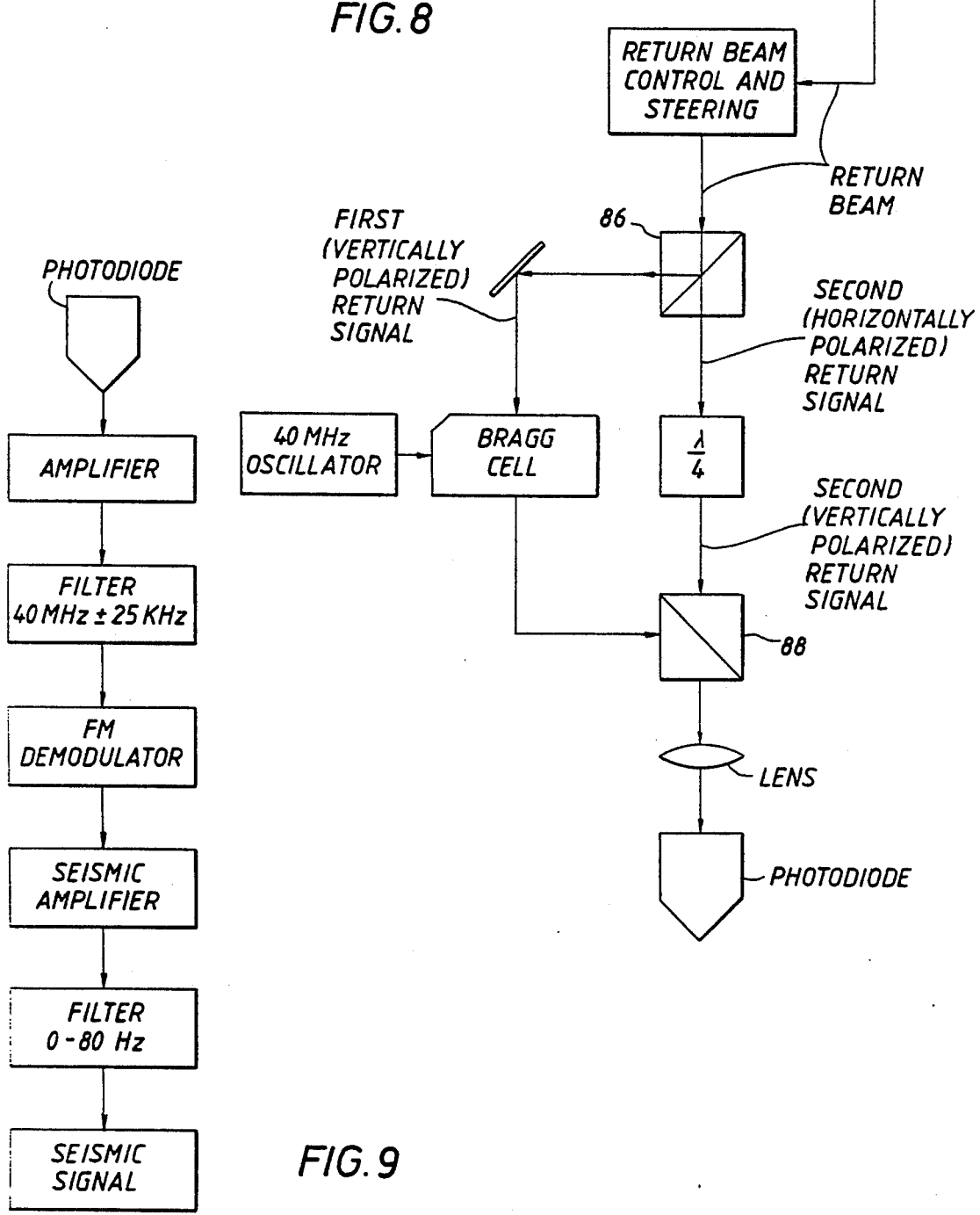

APPARATUS FOR REMOTE SEISMIC SENSING OF ARRAY SIGNALS USING SIDE-BY-SIDE RETROREFLECTORS

FIELD OF THE INVENTION

This invention relates to remote detection systems which use laser Doppler interferometry techniques to detect motion with electromagnetic waves, and more particularly, to laser Doppler interferometry techniques used in seismic surveying to detect ground motions which represent seismic signals.

BACKGROUND OF THE INVENTION

It is generally the objective of seismic exploration to generate seismic energy, make measurements of and record the amplitude of any reflected and refracted energy at selected locations and for selected times, and then by selectively processing the recorded seismic data, to deduce the geometry of the subsurface geologic boundaries as well as some properties of the materials of the earth through which the seismic energy has propagated and from which it has been reflected.

Conventional land seismic acquisition techniques involve the use of an appropriate source (dynamite, vibrator(s), airguns(s), etc.) to generate seismic energy and a set of detectors, spread out on the surface of the earth, to detect any seismic signals due to seismic energy interacting with subsurface geologic boundaries. These detected signals are recorded as a function of time and subsequent processing of these signals, i.e., seismic "traces" or seismic data, is designed to reconstruct an appropriate image of the geologic boundaries of the subsurface and to obtain information about the subsurface materials.

Conventionally, the detector employed to detect seismic signals on land is a geophone. A geophone is an electro-mechanical device that is coupled to the ground via an extension or "spike" that is physically inserted into the ground. This allows the geophone case to vibrate because of any earth motions, including seismic signals. Internal to the geophone case and vibrationally isolated from the case (typically by springs) is an "inertial" mass that does not vibrate with the earth. Thus, there is a small relative motion between the geophone case and its inertial mass due to any detected ground motions. This relative motion is converted to an electrical signal by having a coil of wire that moves through an electromagnetic field of a permanent magnet; the magnet may be the inertial mass with the coil attached to the geophone case, or vice versa. This electrical signal is the seismic signal that is recorded (alone, or more preferably, in combination with other electrical signals) and later processed.

Seismic field layouts vary with the exploration objective sought to be detected. However, there is usually a need to simultaneously record seismic motion at many ground positions spaced over a wide area. A seismic line usually consists of multiple detector stations with each detector station having several geophones whose output signals are combined to form a single signal (array signal) for the detector station. The geophones are arranged in an array to reject unwanted waves while enhancing the reception of desired seismic waves on the electrical signals.

The signals from these arrays (detector stations) are collected and recorded for each seismic shot (seismic energy source). Conventional land seismic data acquisition is slow, expensive and labor intensive. In particular, the activity of laying out a cable which interconnects the detector stations, so that the array electrical signals may be recorded, is time consuming and requires a substantial work force. It would be desirable to have a fast way to move the entire seismic line or portions thereof and thereby minimize survey time.

A radar system which senses seismic ground motion (vibrations) remotely is one solution for reducing the cost and time for acquiring seismic data. Two such systems are described in U.S. Pat. No. 5,070,483, Remote Seismic Sensing, and U.S. Pat. No. 5,109,362, mote Seismic Sensing. Both patents use laser Doppler heterodyne interferometry techniques to detect the movements of the earth.

Another laser Doppler interferometry system is described in U.S. Pat. No. 4,284,350, Laser Geophone, which uses a homodyne system with a detector having side-by-side corner-cube retroreflectors for detecting vertical ground motions at a remote location. The use of a single or a side by side corner-cube retroreflector arrangement is also suggested for some detectors in embodiments of the systems described in the before mentioned U.S. Pat. Nos. 5,070,483 and 5,109,362.

Simplified illustrations of the prior art Laser Geophone (detector) of U.S. Pat. No. 4,284,350 are provided in FIGS. 1A and 1B. FIG. 1A is a front view showing two side-by-side corner-cube retroreflectors 2, 4. The prior art detector modulates two approximately horizontal laser beams (a first and second sensing beam) which illuminate the detector. The sensing beams are reflected at the detector downward by a mirror 6 onto the side-by-side (first and second) corner-cube retroreflectors 2, 4. The first sensing beam is reflected from the mirror 6 to the first retroreflector 2; the second sensing beam is reflected from the mirror 6 to the second retroreflector 4. The mirror 6 and the first retroreflector 2 are coupled to the motions of the ground, i.e., they are seismically coupled to the motions of the earth; the second retroreflector 4 is inertially isolated from the motions of the ground in the vertical direction.

Each sensing beam is frequency modulated by the detector. When a sensing beam is incident normally on an optical component which reflects (or deflects) the path of the incident sensing beam (such as the mirror 6 or retroreflectors 2, 4), the frequency of the beam may be frequency modulated (Doppler shifted). The amount of Doppler shift at each reflection point is proportional to the relative velocity of the reflection point on the Doppler shifting optical component with respect to the incident path of the beam which strikes that point. As the beam is reflected through the detector, the Doppler shifts are cumulative; thus, the Doppler shifts add or subtract from the previous Doppler shifts on the beam. Upon exiting the detector, if the points of reflection on the combination of Doppler shifting optical components have undergone a net relative movement along the incident paths of the sensing beam, the cumulative movement of the reflection points would represent a net velocity with respect to the sensing beam. And, the sensing beam will be Doppler shifted (frequency modulated) by an amount which represents the net velocity of these reflection points relative to the incident paths of the sensing beam.

In this specification, an orthogonal coordinate system is used. The terms "vertical" and "horizontal" are used with respect to the motions of the earth at the detector.

Vertical defines one ordinate for motions back and forth or up and down along the vertical ordinate. The horizontal is further defined with respect to the path of the transmitted sensing beam to identify a horizontal-inline ordinate and a horizontal-crossline ordinate. A horizontal line, formed by intersecting a vertical plane which extends in the inline direction of a transmitted beam with a horizontal plane, defines the horizontal-inline ordinate and the horizontal-inline direction. A horizontal line perpendicular to the horizontal-inline ordinate defines the horizontal-crossline ordinate and horizontal-crossline direction.

Returning to the prior art detector, FIG. 1B shows a side view of the prior art detector of FIG. 1A. Mirror 6 is shown to be at approximately a 45 degree angle with respect to vertical direction and parallel to the horizontal-crossline direction. Since the mirror 6 is coupled to the motions of the ground, the movement of the mirror 6 with respect to the path of both sensing beams imparts a Doppler shift on the sensing beams each time the sensing beams reflect from mirror 6; these Doppler shifts will represent motion in two directions, the relative vertical movement of the mirror and the horizontal-inline movement of the mirror with respect to the incident paths of the beams. Here, no Doppler shift is contributed to the beams for horizontal-cross line movement by the mirror 6 because the mirror is parallel to the horizontal-cross line direction. In the horizontal-crossline direction, the mirror has no relative movement with respect to the incident paths of the beam; thus, these motions do not Doppler shift the beams.

Returning to FIG. 1A, each sensing beam upon initial reflection by the mirror 6 enters the aperture of their respective corner-cube retroreflector 2, 4. A corner-cube (trihedral) retroreflector has the property that any ray entering the effective aperture will be reflected and emerge from the entrance/exit face parallel to itself, but with an opposite direction of propagation. An incident beam, hitting the effective aperture, is reflected exactly back on itself. These properties are, within acceptable angle limits, independent of the orientation of the corner-cube retroreflector. Because the incident beam is reflected within the retroreflector such that the reflected output beam is reflected exactly back on itself, the individual rays of the reflected beam are parallel to their initial position in the incident beam which strikes the retroreflector. This characteristic of the retroreflector is due to the structure of a corner-cube retroreflector; it has three mutually perpendicular reflectors and each ray entering the retroreflector will reflect from each reflector before exiting.

Each of the reflectors move in the same direction, but because they face each other, each reflector has a different relative motion with respect to an incident beam striking it from the previous reflector. Since each ray reflects from each mutually perpendicular reflector, the net relative movement for lateral motions on the corner-cube with respect to that ray is zero; thus, the Doppler shifts, placed on each ray for the lateral motions on each reflector as it reflects through the corner-cube, cancel. In this case, the lateral motions on retroreflectors 2, 4 are motions in the horizontal-inline and horizontal-crossline directions.

However, for motions back and forth along the path of the beam from the mirror 6 (here, the vertical direction), the net relative motion is not zero and the beam will be Doppler shifted to reflect this motion.

After each sensing beam is reflected by the retroreflectors 2, 4, they are again reflected (and Doppler shifted), as discussed previously, by the mirror 6. Note that the Doppler shifts imposed on each beam by the mirror are additive. This can be seen by assuming that the mirror is moving upward, the upward motion of the mirror at the 45 degree angle lengthens the path the initial incident beam takes before reflecting from the mirror. The same phenomenon occurs for the incident beam reflected from a retroreflector (the upward motion of the mirror 6 also tends to lengthen the path of the incident beam from the retroreflector); thus, the mirror has a net relative motion in the vertical direction with respect to each beam of FIG. 1A. A similar analysis could be made for mirror motions in the horizontal-inline direction to determine that the mirror 6 has a net relative motion in the horizontal-inline direction.

However, the relative vertical motions of the mirror 6 and retroreflector 2 are in opposite directions with respect to the path of the first sensing beam through the detector of FIG. 1A. This can be seen by noting that when mirror 6 is moving vertically upward, retroreflector 2 also moves in an upward direction. But, the upward motion of retroreflector 2 shortens the incident path of the beam from the mirror; whereas, the upward motion of the mirror lengthens the incident paths of the beams that strike the mirror; thus, the (vertical motion) Doppler shifts imposed on the beam by the retroreflector are opposite to the cumulative Doppler shifts imposed on the beam by the mirror for vertical motions. Since the cumulative vertical Doppler shifts from the mirror 6 are approximately equal to the Doppler shifts from the retroreflector 2, these vertical Doppler shifts cancel. Thus, the frequency modulated first sensing beam of this example contains Doppler shifted frequency components which represent only horizontal-inline ground motions at the Laser Geophone.

The frequency modulated second sensing beam also contains Doppler shifted frequency components because of the motions of mirror 6. However, these frequency components represent vertical ground motions as well as horizontal-inline ground motions. This is because, the inertially isolated retroreflector 4 only acted to reflect the beam; it had no motion in the vertical direction; thus, it did not add to or cancel any Doppler shifted frequency components on the second sensing beam.

In theory, this type of side-by-side retroreflector detector provides Doppler shifted frequency components on the two modulated sensing beams which are approximately identical (common mode signals). Here, the common mode signals represent the horizontal-inline motions on the detector. In addition, this prior art configuration also provides frequency components which are not common to the two beams. In this particular case (the Laser Geophone system), when the modulated beams are combined by optical homodyning, the common mode signals cancel each other and a difference signal (the frequency components which are not common to both beams) remains. One problem with a homodyning system is that it is not possible to determine "up" Doppler and "down" Doppler motion from the obtained difference signal. This problem is resolved by using a heterodyning system instead. However, in spite of this problem, the difference signal provided by this prior art homodyning system does represent the vertical motions of the earth at the remote location.

A side-by-side corner-cube retroreflector configuration, as mentioned, is also suggested for some embodiments of the prior art heterodyning systems of previously mentioned U.S. Pat. Nos. 5,070,483 and 5,109,362. However, the configurations taught in these patents do not deflect or reflect a sensing beam onto retroreflectors.

These systems, however, require at least one sensing beam and return beam for each detector (geophone equivalent). An array may have as many as 32 geophones for each detector station and a seismic line may have a hundred or more detector stations. If 3-D detection is desired, there could be many additional seismic lines. The number of sensing and return beams necessary to acquire this data by a remote sensing system could be substantially reduced if only one sensing beam and return beam are used for each detector station.

Also, the positioning of a remote detector is determined by maintaining a line of sight between each remote detector and the sensing beam transmitter and receiver. It may not be possible due to local obstacles to arrange remote detectors into an optimum array configuration for each detector station.

In addition, small seismic motions may not be detectable by these prior art systems. A large seismic motion (motion of the earth) induced in exploration surveys may be on the order of $1 \times 10^{-2}$ m/sec so the maximum Doppler shift at the higher conventional laser frequencies is around 30 kHz (Fdop=2 Vseis/Wavelength, where Fdop is the Doppler shift, Vseis is the relative velocity (cumulative velocity) at the remote location and Wavelength is the wavelength of the carrier frequency of the transmitted laser beam). A small seismic motion which is capable of producing a Doppler on a sensing beams may be on the order of $2.0 \times 10^{-6}$ m/sec. This small seismic motion on the above system would produce a Doppler shift of about 6.0 Hz. A difference signal having a Doppler shift this small may not be detectable due to equipment limitations, e.g., frequency drift and equipment noise, or to turbulence induced frequency fluctuations.

Turbulent noise may affect the side-by-side corner-cube retroreflector configurations of the before mentioned designs, or any other type of side-by-side retroreflector design. This is because this type of remote detector necessarily requires that two sensing beams (taking into consideration line of sight between the locations) travel different paths through the air to and from the retroreflectors. Separate air paths may have different effects upon the propagating laser sensing beams. Solar radiation heats the ground surface, causing convective air currents which break into turbulent flow. These randomly sized (roughly 1 millimeter to 1 meter) air packets have anomalous temperatures and refractive indices. The optical phase of each laser beam shifts as it passes through a region of anomalous refractive index. These air packets blow across the raypath and cause time-varying, random frequency modulation of the laser beam. Thus, two laser beams traveling through different air spaces will experience different fluctuations in each carrier frequency of the laser beams.

Since, the two laser beams are spatially separated, they will not be affected equally by the atmosphere and the atmospheric effects on the beams are not totally common mode signals. The atmospheric effects do not completely cancel when the two laser beams are combined by optical homodyning or heterodyning or by electronic homodyning when the beams are converted to electrical signals. Thus, the difference signal will not only contain the desired Doppler signal but also an additional component which will be referred to herein as turbulent noise. Turbulent noise is especially prevalent on sunny, windy days. Consequently, if side by side retroreflectors are used as parts of the detector in a remote seismic sensing system, the presence of turbulent noise on the difference signal could prevent an accurate determination of the desired (or selected) ground motions (the desired Doppler signal).

If the amount of Doppler shift representing the desired difference signal could be increased, seismic signals having smaller amplitudes could be detected. The increased Doppler shift would ensure that the difference signal is greater than the inherent equipment limitations of the remote detecting system. In addition, the increased Doppler shift of the desired difference signal would be much larger than the Doppler shift contributed by the turbulent noise; thus, the relative amount of turbulent noise present on the difference signal could be substantially reduced.

SUMMARY OF THE INVENTION

An object of this invention is to provide a remote sensing system which is adapted to provide a single array signal for each detector station.

Another object of this invention is to provide a remote sensing system which enhances the Doppler modulation imposed on an optical carrier by amplifying an electrical array signal so as to increase the velocity of a Doppler shifting optical component of the sensing system.

An additional object of this invention is to provide a bipolarized, differential mode, LDI remote sensing system which is adapted to reduce the effect of turbulent noise on the system by increasing the amplitude of an array signal thus causing a deviation of optical carrier frequency that is substantially greater then the optical frequency fluctuations caused by atmospheric turbulence.

Another object of this invention is to provide a remote sensing system which transmits a sensing beam (beams) to illuminate a target (an array retroreflector apparatus), and receives from the target two transversely polarized return sensing signals, one of the return sensing signals having frequency components which were produced by Doppler shifting the sensing signal with an array signal.

An additional object of this invention is to provide a target (an array retroreflector apparatus) which is functional: (a) to be coupled to motions at a remote location (seismic as well as other motions such as wind induced motion), (b) to separate from the sensing beam (beams) two polarized sensing signals (the polarity of the sensing signal being orthogonal to each other), (c) to frequency modulate the sensing beams and signals by Doppler shifting them so that the return sensing signals contain frequency components which represent common motions on the target, to Doppler shift one of the polarized sensing signals with an array signal so that the return sensing signals have between them a difference signal which represents the array signal, and to return the sensing signals on adjacent and approximately parallel return propagation paths to a receiver.

In accordance with the objects of the present invention, there is provided a remote sensing system which uses a bipolarized, differential mode LDI (laser differential interferometry) system. The differential mode LDI system of this invention uses an array retroreflector apparatus (target), which is coupled to motions, e.g., ground motions, wind motions, etc., at the detector station, to provide two return sensing signals which enable the system to detect an electrical signal produced at the detector station.

The target is a remote detector which functions to convert a sensing beam (beams) into two polarized return sensing signals, a first return sensing signal and a second return sensing signal. The polarity of the first return sensing signals is orthogonal to the second return sensing signal. Both of the return sensing signals have been frequency modulated within the target to contain frequency components that represent common motions on the target and to contain between the modulated signals a difference signal which represents the electrical signal. In preferred embodiments, an array is used to provide the electrical signal.

A plurality of connected seismic detectors at the remote location (detector station) make up an array. Combining the seismic signals detected by each seismic detector into a combined signal provides an array signal. In highly preferred embodiments, the array signal is amplified. The array signal drives an optical component within the target to frequency modulate one of the sensing signals by Doppler shifting the sensing signal to have frequency components which represent the array signal. The Doppler shifting optical component is driven to increase its relative velocity with respect to the sensing signal so that the frequency deviation of the array Doppler shifted signal is substantially greater than other Doppler shifted signals which may be on either of the return sensing signals, such as, signals which represent turbulent noise.

The return sensing signals are detected by a receiver. The different polarities of the sensing signals allow the receiver initially to separately process the sensing signals so that the return sensing signals may be combined by electronic and/or by optical heterodyning techniques to cancel any common mode signals that were present on the return sensing signals, thereby, leaving a frequency modulated difference signal which, ideally, represents only the array signal of the detector station. However, in some cases, turbulent noise may be present on the difference signal. But, if turbulent noise is present, in preferred embodiments, it will be substantially less than by other prior art methods because the predominant signal contribution to the difference signal is the Doppler shifted array signal. The frequency modulated signal may be demodulated to provide a time varying signal which represents the seismic trace of the combined seismic motions detected at the detector station. If present, the turbulent noise may be further reduced on the difference signal (either as a frequency modulated difference signal or as time varying difference signal) by filtering or other processes known to practitioners of the art such as stacking.

In one embodiment of the array retroreflector apparatus, a casing is coupled to motions at the detector station. Rigidly attached to the casing are a mirror, a first corner-cube retroreflector, and a transducer. A second corner-cube retroreflector is attached to the transducer and coupled to the motions on the casing through the transducer; both retroreflectors are aligned to reflect along a vertical ordinate; thus, the two retroreflectors are in a side-by-side configuration. Each retroreflector has a polarizer covering its aperture.

Two approximately parallel sensing beams, a first and a second sensing beam, having an approximately horizontal propagation path will first reflect from the mirror. Preferably, the mirror is planar in an approximately crossline direction and at an approximately 45 degree angle from vertical. Each sensing beam reflects from the mirror along the vertical ordinate toward the retroreflectors. The mirror frequency modulates each sensing beam by Doppler shifting the beams to have a first grouping of frequency components which represent some of the motions coupled to mirror through the casing. These Doppler induced frequency components by the mirror are common mode signals to both sensing beams. The casing motions represented in the first grouping of frequency components of each beam are motions having directions of movements which are inline with the horizontal-inline direction and the vertical direction.

The reflected first sensing beam encounters the polarizer over the first retroreflector, where a first (polarized) sensing signal is separated from the sensing beam. The first sensing signal then encounters the first retroreflector which reflects the signal back to the mirror. The first retroreflector Doppler shifts the first grouping of frequency components on the first sensing signal into a second grouping of frequency components which includes the effects of vertical motions coupled thorough the casing to the first retroreflector.

When the first signal returns to the mirror, the first sensing signal is reflected to its return propagation path and the mirror, again, Doppler shifts the signal. Here, the second grouping of frequency components on the first sensing signal is Doppler shifted into a third grouping of frequency components which represents the cumulative horizontal-inline motions of the mirror. The third grouping of frequency components does not contain any frequency components which represent vertical motions because the cumulative vertical motions of the mirror and the first retroreflector are approximately equal and have opposite relative motions with respect to the first sensing beam and signal.

The reflected second sensing beam encounters the polarizer located over the second retroreflector. This polarizer separates a second (polarized) sensing signal for the second sensing beam. The second sensing signal then reflects from the second retroreflector back to the mirror. The transducer, upon which, the second retroreflector is mounted, is functional to be coupled to an electrical signal and to cause the second retroreflector to move vertically in response to the electrical signal; accordingly, when the electrical array signal is fed to the transducer, the second retroreflector moves vertically in response to the signal. When the second sensing signal is reflected by the second retroreflector, the second retroreflector Doppler shifts the first grouping of frequency components on the second sensing signal into a second grouping of frequency components which includes the effects of the vertical motions on the casing coupled through the transducer to the second retroreflector and the vertical motions of the second retroreflector caused by the array signal on the transducer.

At the mirror, the second sensing signal is reflected to its return propagation path, the path being approximately parallel to the propagation path of the first sensing signal. When reflecting the signal, the mirror again frequency modulates the second sensing signal. In this case, the second grouping of frequency components is Doppler shifted into a third grouping of frequency components which represents the array signal and the cumulative horizontal-inline motions of the mirror. The vertical motions on the casing, which are coupled to the mirror and the second retroreflector, are again canceled as described previously. The common mode signals on the two return sensing signals represent the horizontal-inline motions on the casing.

These and other objects and advantages of the present invention will no doubt become apparent to those of skill in the art after having read the following detailed description of the preferred embodiments which are contained herein and illustrated by various figures.

The invention encompasses the heretofore described preferred embodiments as well as the embodiments as are described hereinafter and as will be apparent to those of skill in the art.

BRIEF DESCRIPTION OF THE DRAWING

FIG. 1A is a prior art cross sectional front view of a prior art detector.

FIG. 1B is a cross sectional side view of the prior art detector of FIG. 1A.

FIG. 4A is a simplified cross sectional diagram of transversely polarized return sensing signals having some overlap.

FIG. 4B is a simplified cross sectional diagram of a circularly polarized sensing beam.

FIG. 4C is a simplified cross sectional diagram of a vertical polarized sensing signal.

FIG. 4 is simplified cross sectional diagram of a horizontal polarized sensing signal.

FIG. 8 is a simplified top view of an optical block diagram of the transmitting and detecting portion of one heterodyning embodiment of a differential mode LDI remote sensing system which uses a single photodetector.

FIG. 9 is a block diagram of the electronic stages of the embodiment of the laser Doppler radar remote sensing system of FIG. 8.

DETAILED DESCRIPTION OF THE PREFERRED EMBODIMENT

The invention is a radar system which remotely senses an array signal by bipolarized, differential mode, laser Doppler interferometry. The remote sensing system may operate as a homodyne system or a heterodyne system. However, in preferred embodiments, the remote sensing system operates as a heterodyning system. The radar system could be either airborne or ground based. The remote sensing system includes a sensing beam generation and transmission system, a remote detector which is referred to herein as an array retroreflector apparatus (target), and a receiver which includes a return beam detection system, a homodyning or heterodyning system and a demodulation system. The target is also referred to herein as an array remote detector. The system is described, herein, for remotely detecting an array signal at a detector station (a selected or remote location). The array signal is obtained from a plurality of connected seismic detectors which make up an array. The seismic detectors may be geophones, hydrophones or other devices which sense seismic signals. In addition, the geophones may be capable of detecting seismic motion in the vertical, inline and cross-line directions.

It should be understood that a plurality of the described embodiments of this invention will provide for remotely measuring array signals at many detector stations simultaneously. In addition, this invention is not limited to the detection of an array signal. Any electrical signal which may be coupled to the embodiments presented herein of the array retroreflector apparatus may be detected by the use of this invention.

Figure 2:
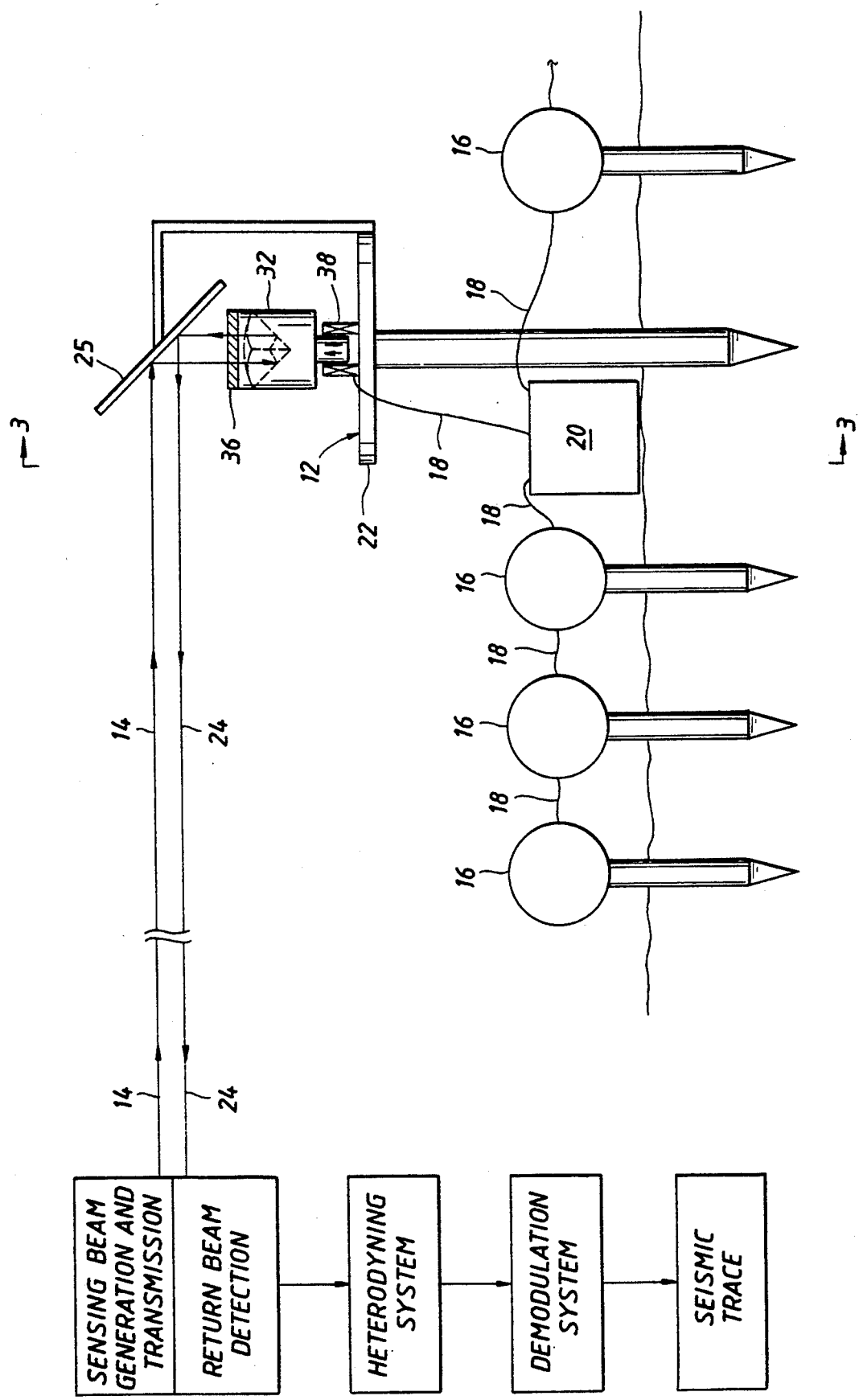
FIG. 2 is general layout and simplified block diagram of the remote sensing system of this invention, the general layout including a side view of one embodiment of an array retroreflector apparatus.

In embodiments of the present invention, methods and apparatus are provided for remotely sensing an array signal which represents seismic vibrations at the earth's surface. In some applications of the embodiments of this inventions, the earth's surface could be water covered. Referring to FIG. 2, the figure depicts a general layout and simplified block diagram of one embodiment of the remote sensing system of this invention. The figure includes a side view of an array retroreflector apparatus 12. The radar system uses a continuous wave (CW) or pulsed laser beam to provide a transmitted sensing beam 14 which illuminates the array retroreflector apparatus (target) 12 at a detector station where an array signal is to be detected. Preferably, the sensing beam 14 has a substantially monochromatic frequency. In this embodiment, the seismic detectors are Geophones 16 that are arranged at the ground station in an optimum array pattern for the seismic signals to be detected and are shown connected by cables 18 to obtain a single array signal for the ground station. The cables 18 may be connected to an amplifier, 20. Preferably, the amplifier will provide for a gain of at least 30 dB (decibels) in the power of the combined geophone electrical signals (the array signal). The increase in the power of the array signal, increases the amplitude of the array signal.

The array remote detector 12 does not have to be located at any specific location within the area of the detector station. It may be moved to avoid obstacles within the line of sight of the sensing beam. The array retroreflector apparatus 12 may also be mounted at an elevation to be above local obstacles that are within the line of sight of the sensing beam transmitter or it may be mounted closer to the ground if there are no local obstacles.

The array retroreflector apparatus 12 has a casing 22 which is coupled to motions at the detector station. In this specification, these motions may have any of three orthogonal directions of movement. These motions may include seismic, wind, and wave induced motions. Upon illumination of the target 12, the target converts the sensing beam 12 into two approximately parallel return sensing signals 24 (shown as one line on FIG. 2), both of the return sensing signals having been frequency modulated to have frequency components which represent common motions on the target and to contain between the modulated signals, a difference signal which represents an array signal. In addition, the return sensing signals 24 are returned on return propagation paths which are approximately parallel to each other and to the propagation path of the sensing beam (beams) 12. The direction of propagation of the return sensing signals is opposite to the direction of propagation of the sensing beam (beams) 12.

Figure 3:
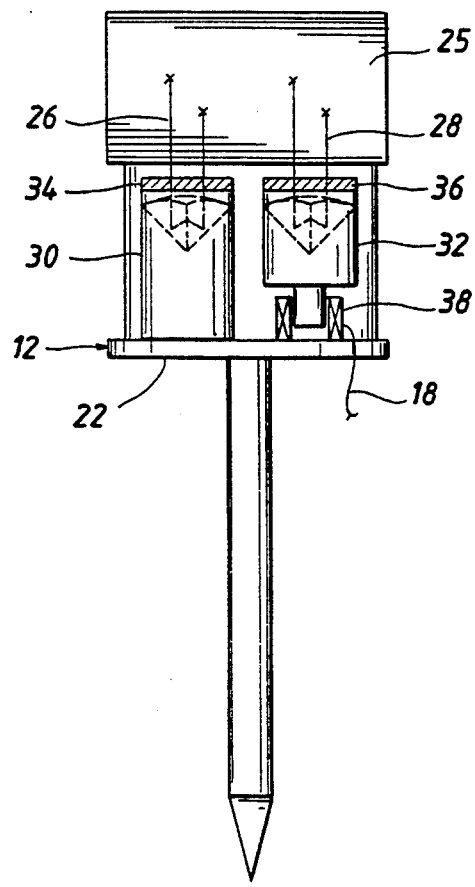
FIG. 3 is the front view of the embodiment of the array retroreflector apparatus of FIG. 2.

Referring now to FIG. 3, a front view is provided for the array remote detector 12. Initially, the target reflects the sensing beam from mirror 25 as two sensing beams 26, 28 toward corner-cube side-by-side retroreflectors, a first retroreflector 30 and a second retroreflector 32. Earlier explanations in this specification have discussed the sensing beam in terms of two transmitted sensing beams. However, a single sensing beam which diffuses to increase its cross sectional area between the transmitter and the target may be used to practice this invention and it is the preferred method. A diffused sensing beam may have some movement along the centerline of the beam due to vibrations on the transmitter, yet it will still illuminate the target. Thus, portions of a diffused, transmitted single beam may be used as the sensing beams that are modulated by the target. However, even though the two portions may come from the same diffused beam, each portion travels through a different air space. Consequently, they would be subjected to slightly different atmospheric effects between the transmitter and the detector 12.

In this embodiment of FIG. 3, a first (polarized) sensing signal is separated from the first sensing beam by first polarizer 34 and a second (polarized) sensing signal is separated from the second sensing beam 28 by second polarizer 36. The two polarized sensing signals have polarities which are orthogonal to each other. Sensing signals having different polarities may be separately identified and processed by a receiver so that the two signals may be combined in a heterodyning process which provides identification of "up" and "down" Doppler motions. In preferred embodiments of this invention which use a sensing beam(s) operating at infrared frequencies, the polarizers are wire grid polarizers.

By the placement of optical components normal to the path of the sensing beams and signals within the target (such as, the mirror 25, the first retroreflector 34 and the second retroreflector 36), these optical components are used to reflect and to Doppler shift the sensing beams and signals.

These optical components are attached to the casing 22; thus, they are also coupled to motions upon the casing. When these coupled components move in directions along the path of either sensing beam or signal as a result of motions on the casing, the components cause the sensing beam or signal to be frequency modulated (FM), i.e., some movements of the coupled components impose a Doppler shift on the sensing signals at each location within the target where these moving components reflect the signals.

In this particular embodiment of FIGS. 2 and 3, the second retroreflector 36 is mounted on transducer 38 and attached to the casing 22 through the transducer 38. The transducer 38 is coupled to the electrical signal by connecting the transducer to the amplifier 20 with cable 18. Herein, the transducer 38 is an electro-mechanical device which transforms the array electrical signal to mechanical motion. The transducer 38 may operate as a moving coil, a moving iron, an electrostatic, magnetostrictive, or piezoelectric transducer. In this embodiment, the amplified array signal, when input into the transducer 38, causes the second retroreflector to move inline with the vertical ordinate. This vertical motion imposes a Doppler shift upon the second sensing signal when it is reflected from this retroreflector. These Doppler shifted frequency components are representative of the array signal.

The cumulative (net) Doppler shift imposed on each signal represents the net relative motions (velocities) of the Doppler shifting optical components with respect to the incident paths of the beams and signals striking the coupled components. Since the velocities and/or movements of the optical components are a function of the motions of the earth (the array signal and the seismic signals) and the motions due to other external forces on the casing such as the wind, the array retroreflector apparatus 12 of this invention imposes Doppler shifts on the sensing signals which are proportional to the surface particle velocity at the remote location for some ground motions and also proportional to the velocity of the other Doppler inducing motions. In particular, even when the combined electrical signals produced by the geophones are amplified, the amplified signal will still represent the surface particle velocity. However, the increase in the amplitude of the array signal will result in the transducer causing the second retroreflector to move over a greater distance in the same period of time; thus, the second retroreflector has, as an example, an increased velocity in comparison to the first retroreflector in responding to "local" vertical motions relative to the path of the sensing signal, and, as a result, the Doppler shifts (the frequency deviations from the carrier frequency) imposed on the sensing signal by this amplified motion will be greater than the vertical motions imposed on the casing by seismic motions of the earth. With larger Doppler shifts for the array signal, the remote sensing system will be able to detect weak seismic signals which may not be detectable by other prior art remote detection systems due to equipment limitations (frequency stability, background noise, etc.).

Again referring to FIG. 3, a detailed explanation of the array retroreflector apparatus of this embodiment is provided. Two approximately parallel sensing beams, a first 26 and a second sensing beam 28, having an approximately horizontal propagation path, will first reflect (deflect) from mirror 25. Preferably, the mirror is approximately planar in the crossline direction and at an approximately 45 degree angle from vertical. Each sensing beam reflects from the mirror along the vertical ordinate (a first sensing path and a second sensing path) toward the corner-cube retroreflectors 30, 32. The mirror 25 frequency modulates each sensing beam by Doppler shifting the beams to have a first grouping of frequency components which represent some of the motions coupled to the mirror through casing 22. The casing motions represented in the first grouping of frequency components are motions having directions of movements which are inline with the horizontal inline direction and the vertical direction.

The first sensing beam encounters a first polarizer 34 over the first retroreflector, where a first (polarized) sensing signal is separated from the sensing beam. The first sensing signal then encounters the first retroreflector 30 which reflects the signal back to the mirror 25. The first retroreflector 30 Doppler shifts the first grouping of frequency components on the first sensing signal into a second grouping of frequency components which includes the effects of vertical motions coupled thorough the casing 22 to the first retroreflector 30.

When the first signal returns to the mirror 25, the first sensing signal is reflected to its return propagation path, and the mirror, again, Doppler shifts the signal. Here, the second grouping of frequency components on the first sensing signal is Doppler shifted into a third grouping of frequency components which represent the cumulative horizontal-inline motions of the mirror 25. The third grouping of frequency components does not contain any frequency components which represent vertical motions on the target because the cumulative vertical motions of the mirror 25 and the first retroreflector 30 are approximately equal and have opposite relative motions with respect to the path of first sensing beam and signal.

The second sensing beam 28 encounters a second polarizer 36 over the second retroreflector 32. This polarizer 36 separates a second (polarized) sensing signal for the second sensing beam. The second sensing signal then reflects from the second retroreflector 32 back to the mirror 25. The transducer 38, upon which, the second retroreflector 32 is mounted, is functional to cause the second retroreflector 32 to move vertically in response to an amplified electrical array signal which is fed to the transducer by cable 18; accordingly, when the electrical array signal is fed to the transducer 38, the second retroreflector 32 moves vertically in response to the signal. When the second sensing signal is reflected by the second retroreflector 32, the second retroreflector 32 Doppler shifts the first grouping of frequency components on the second sensing signal into a second grouping of frequency components which includes the effects of the vertical motions on the casing 22 that are coupled through the transducer 38 to the second retroreflector 32 and the vertical motions of the second retroreflector 32 caused by the array signal being coupled to the transducer 38.

At the mirror 25, the second sending signal is reflected to its return propagation path. When reflecting this signal, the mirror 25 again frequency modulates the second sensing signal. In this case, the second grouping of frequency components is Doppler shifted into a third grouping of frequency components which represents the array signal and the cumulative horizontal-inline motions of the mirror 25. The vertical motions on the casing 22 that are coupled to the mirror and the second retroreflector 32 are again canceled as described previously. The common mode signals on the two return sensing signals represent the horizontal-inline motions on the casing.

Returning to FIG. 2, the sensing signals, after being modulated and reflected through the target, become return sensing signals 24 when they are reflected by the mirror 25 to their return propagation paths. The return sensing signals have approximately parallel return propagation paths with respect to each other and with respect to the propagation path of the sensing beam (beams). In addition, the return propagation paths have a direction of propagation which is opposite to the sensing beam's (beams) 14 direction of propagation. Since the return signals 24 have separate return propagation paths, they are subject to different atmospheric effects on the return propagation path to the receiver.

Preferably, the amplification of the array signal should provide enough Doppler shift to the modulated array signal on the second sensing signal so that the frequency deviation of the Doppler shifted array signal is much greater than any frequency fluctuations contributed by the atmospheric effects on the sensing beams and the return sensing signals.

Diffusion of the return sensing signals may result in the signals overlapping. FIG. 4A is a simplified cross sectional diagram of two transversely polarized return sensing signals having a region of overlap. In the overlap region, atmospheric effects on the two signals may be common mode. However, in the areas that the signals do not overlap, the turbulent noises on the two return sensing signals differ, i.e., the turbulence does not impose exactly the same common mode signal on both signals, and complete cancellation is not achieved.

The return sensing signals are detected by the return beam detection system of the receiver. At the receiver, in preferred embodiments, each polarized signal is processed so that the two return sensing signals may be combined in an electronic heterodyne and/or optical homodyne or heterodyne process to obtain a frequency modulated difference signal. The frequency modulated difference signal, ideally, represents only the array signal. However, some turbulent noise may be present on the difference signal. When the frequency deviation of the array signal is much greater than the frequency fluctuations caused by the turbulent noise, the turbulent noise may be removed or reduced by filtering or other processes known in the art, e.g., stacking or ignored being so weak. The frequency modulated signal may be frequency demodulated to produce a time varying difference signal (amplitude modulated). The time varying difference signal is the seismic trace of the array signal. In some cases, it may not be necessary to remove the turbulent noise from the signal; since the array signal is so predominate (due to the enhanced Doppler shift of the array signal as a result of the amplification of the electrical array signal), the turbulent noise would add little distortion to the signal.

The bipolarized, differential-mode remote sensing system of this invention allows the use of a single sensing diffused beam to illuminate the target. In this specification, the term "differential-mode" means that two sensing signals having a difference signal between them are returned from the target for processing in the receiver. In this invention, these two signals are obtained by separating, as mentioned previously, two polarized sensing signals, from two portions of the diffused sensing beam 14 by the target 12.

In one highly preferred embodiment, a circularly polarized sensing beam is used for the diffused sensing beam. It is well known to practitioners of the art that circularly polarized light is a special case of a transverse polarized beam. It may be considered as two beams (a first and a second polarized component) of equal intensities and of the same frequency such that the two components have perpendicular polarizations with a common propagation vector which rotates at the same frequency as the carrier frequency. FIG. 4B is a simplified cross sectional representation of a circularly polarized sensing beam. Within embodiments of the retroreflector apparatus, two non-rotating polarized sensing signals of the same frequency are separated by polarizers from two portions of the circularly polarized sensing beam. As mentioned previously, the polarities of the two sensing signals are orthogonal to each other.

It is also possible to obtain two polarized sensing signals within the retroreflector apparatus from other forms of sensing beams including the case of a sensing beam having a single non-rotating polarization. Preferably, the polarization angle for such a beam is approximately 45 degrees between the desired polarization planes of the separated signals. FIGS. 4C and 4D are simplified cross sectional representations of polarized sensing signals with FIG. 4C representing a polarized signal having a vertically polarized sensing signal and FIG. 4D representing a polarized signal having a horizontally polarized sensing signal. In highly preferred embodiments of this invention, corner-cube retroreflectors are used because a corner-cube retroreflector has fairly robust alignment characteristics with respect to the remaining components of the target. Corner-cube retroreflectors also enable the target to provide a stable return beam propagation path in spite of local movements on the apparatus such as movements caused by the wind. These advantages can be seen by again referring to FIGS. 2 and 3. FIGS. 2 and 3 include a simplified view of the paths of the sensing beams and signals as they reflect through the target. The paths shown (which represent the sensing beam(s) 14, return sensing signals 24, first sensing signal 26, and second sensing signal 28) illustrate the paths of the beams and signals as they illuminate, reflect from the optical components, and leave the target 12 as an aid in the explanation of the operation of this invention. However, the paths are not to scale. The preferred circularly polarized (diffused) sensing beam (or any sensing beam), preferably, has a cross sectional area normally incident upon the mirror 25, such that, upon reflection into the retroreflectors, the each reflected sensing beam will substantially illuminate all of the cross-sections area at the aperture of the retroreflector the beam is incident upon.

The controlling factor for illumination of the array apparatus 12 is that the intensity of the illumination provided to the aperture of the retroreflectors in the target 12 is such that the return sensing signals 24 will have enough power in each return sensing signal to ensure an adequate carrier to noise ratio (CNR) for homodyning or heterodyning and demodulating each signal. The cross sectional area of the sensing beam or return beam may increase over the distances involved in this invention due to beam spreading (diffusion). However, it is possible to control the intensity of the sensing beam or return sensing signals by using additional optical elements to control the rate of beam spreading from the transmitter to the target and/or compress the return beam at the receiver.

Returning to the corner-cube retroreflectors, if they are properly aligned with respect to each other and the mirror 25, they will return the sensing beams exactly back on themselves. Accordingly, if wind or wave motions (assuming, in some embodiments, that the target may be pole mounted over a water covered area or floating) cause the array retroreflector apparatus of FIG. 2 to sway, and even if the retroreflectors move slightly off the vertical ordinate, the return signals, due to the self aligning characteristic of the corner-cube retroreflector, will still be returned to the receiver on a return propagation path which is adjacent and approximately parallel to the propagation path of the sensing beams. In addition, because the mirror 25 and the corner-cube retroreflectors have a fixed geometry with respect to each other, the motions coupled to the casing which cause a Doppler shift for the sensing beams (signals) as a result of the wind will be canceled. The cancellation can occur within the target such as previously described for canceling vertical motions, or it can occur in the receiver because the motions on the casing resulted in creating common mode signals on the sensing beam (signals).

The target may even be subject to small moments about its vertical axis or placed so that the mirror is not exactly parallel with the horizontal-crossline direction. In this case, some horizontal-crossline Doppler shift could occur, but these Doppler shifts would be common mode to both return sensing signals; thus, they will cancel. Additionally, if the mirror during normal operation, e.g., non-windy days, is not at approximately 45 degrees from vertical, the vertical Doppler shifts of the retroreflectors and the mirror may not completely cancel; however, the remaining vertical Doppler shifts which do not cancel within the target, again, are common mode signals to both return sensing signals and they will cancel in the homodyning or heterodyning process.

It can be seen from the previous discussion that by using corner-cube retroreflector with the array retroreflector apparatus of this invention, the target has robust alignment characteristics. A diffused sensing beam may be used to illuminate the target; thus, the sensing beam may have some movement about its centerline due to vibrations on the sensing beam transmitter. In addition, the target does not have to be exactly aligned with the sensing beam. As long as the sensing beam is reflected by the mirror so that the reflected sensing signal enters the effective aperture of a retroreflector, the retroreflector will return the signal so that its return propagation path is adjacent to and parallel to the sensing beam propagation path. Consequently, the target does not have to be exactly aligned with the horizontal-inline axis of the sensing beam.

Figure 5A:
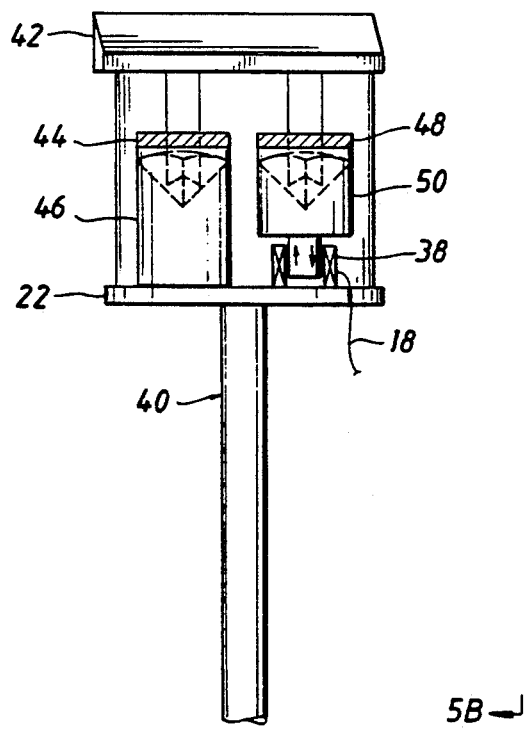
FIG. 5A is a front view of an array retroreflector apparatus adapted for airborne illumination.
Figure 5B:
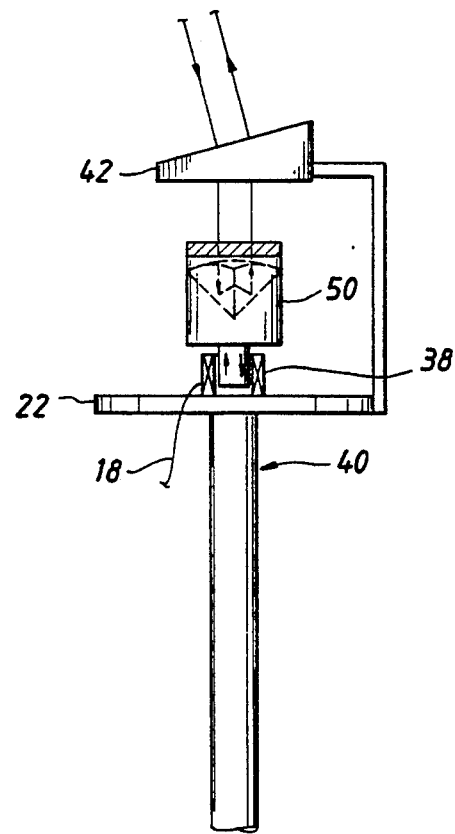
FIG. 5B is a side view of the array retroreflector apparatus embodiment of FIG. 5A.

The remote array signal sensing system of this invention may be elevated above the detector station, such as, the system being used as an airborne system. FIG. 5A is a front view of an array retroreflector apparatus 40 which may be used to convert sensing signals from an airborne remote sensing system into two return sensing signals. FIG. 5B is a side view of the embodiment of FIG. 5A. Lenses, wedges or other optical equivalents may be mounted on above the retroreflectors to increase or change the field of view to the retroreflector apparatus of this invention. Here the deflection method used is a wedge 42. If any Doppler shift is added to the sensing beams as result of the sensing beam or return sensing signal passing through these optical (deflecting) components which increase the field of view, these Doppler shifts will partially cancel in the optical component as the sensing signal leaves the target. However, if there is any remaining Doppler shift added by the optical component that increased the field of view, this Doppler shift will be common mode to both signals; thus, they will cancel when the signals are combined at the receiver.

In the embodiment of FIG. 5A, a wedge 42 deflects two sensing beams, a first sensing beam and a second sensing beam, the beams being deflected to a first sensing path and a second sensing path. In this embodiment, these sensing paths are along a vertical ordinate. A first polarizer 44, aligned with the first sensing path and located over the first corner-cube retroreflector 46, separates a first (polarized) sensing signal from the first sensing beam. The first sensing signal reflects from the first retroreflector 46 back to the wedge 42. The wedge deflects the sensing signal to its return propagation path, the path being adjacent and approximately parallel to the propagation path from the transmitter of the first sensing beam. In reflecting the first sensing signal, the retroreflector Doppler shifts the first sensing signal to have a grouping of frequency components which represents vertical motions coupled to the retroreflector through casing 22.

Second polarizer 48, aligned with the second sensing path and located above a second corner-cube retroreflector 50, separates a second (polarized) sensing signal from the second sensing beam. The second sensing signal reflects from the second corner-cube back to the wedge 42. The wedge 42 deflects the signal to its return propagation path, the path being approximately parallel to the return propagation path of the first sensing signal. The second retroreflector 50 is attached to transducer 38. An electrical array signal is fed to the transducer 38 by cable 18. The transducer causes the second retroreflector to move vertically in response to the array signal. In reflecting the second sensing signal, the second retroreflector 50 imparts a Doppler shift on the signal which represents the vertical motions coupled to the second retroreflector through the transducer and the vertical motions of the retroreflector 50 in response to the electrical array signal on the transducer. The return sensing signals contain common mode signals which represent vertical casing motions.

DIFFERENTIAL MODE LDI

The remote sensing system of this invention features a bipolarized, differential mode, LDI (laser differential interferometry) system. The term "bipolarized, differential mode LDI system" for the purposes of this specification represents a remote sensing system which uses two transversely polarized return sensing signals, both of which has been Doppler shifted by the target to contain frequency components which represent common motions on the target and to contain between them a difference signal which represents the array signal of the detector station; the return signals are then combined by various techniques to obtain a frequency modulated difference signal which represents ground motions detected by the geophones at the detector station. Homodyning or Heterodyning may be used to obtain the difference signal. However, in preferred embodiments of this invention, the remote sensing system uses the heterodyning process.

The use of the designations of "horizontal", "vertical", "first" and "second" in reference to the signals in these explanations are for clarity. Other orientations for the signals to achieve the same results may be used. However, it is highly preferred that the polarities of the return sensing signals be orthogonal with respect to each other.

In addition, the specific components identified on the simplified optical block diagrams in the figures of this specification may be changed to other optical components which provide the same function or combination of functions as shown in the figures to modulate optical signals in order to obtain electrical signals from the return sensing signals. Other optical components which may be used (but not limited to) in the transmission and receiver system or in the target of this invention are: Glan-Taylor polarizing prisms, Glan-Thompson polarizing prisms, Wollaston prisms, Beamsplitting Thompson prisms, beam displacing prisms, etc.

HETERODYNING DIFFERENTIAL MODE LDI SYSTEM WITH REFERENCE BEAMS

Figure 6:
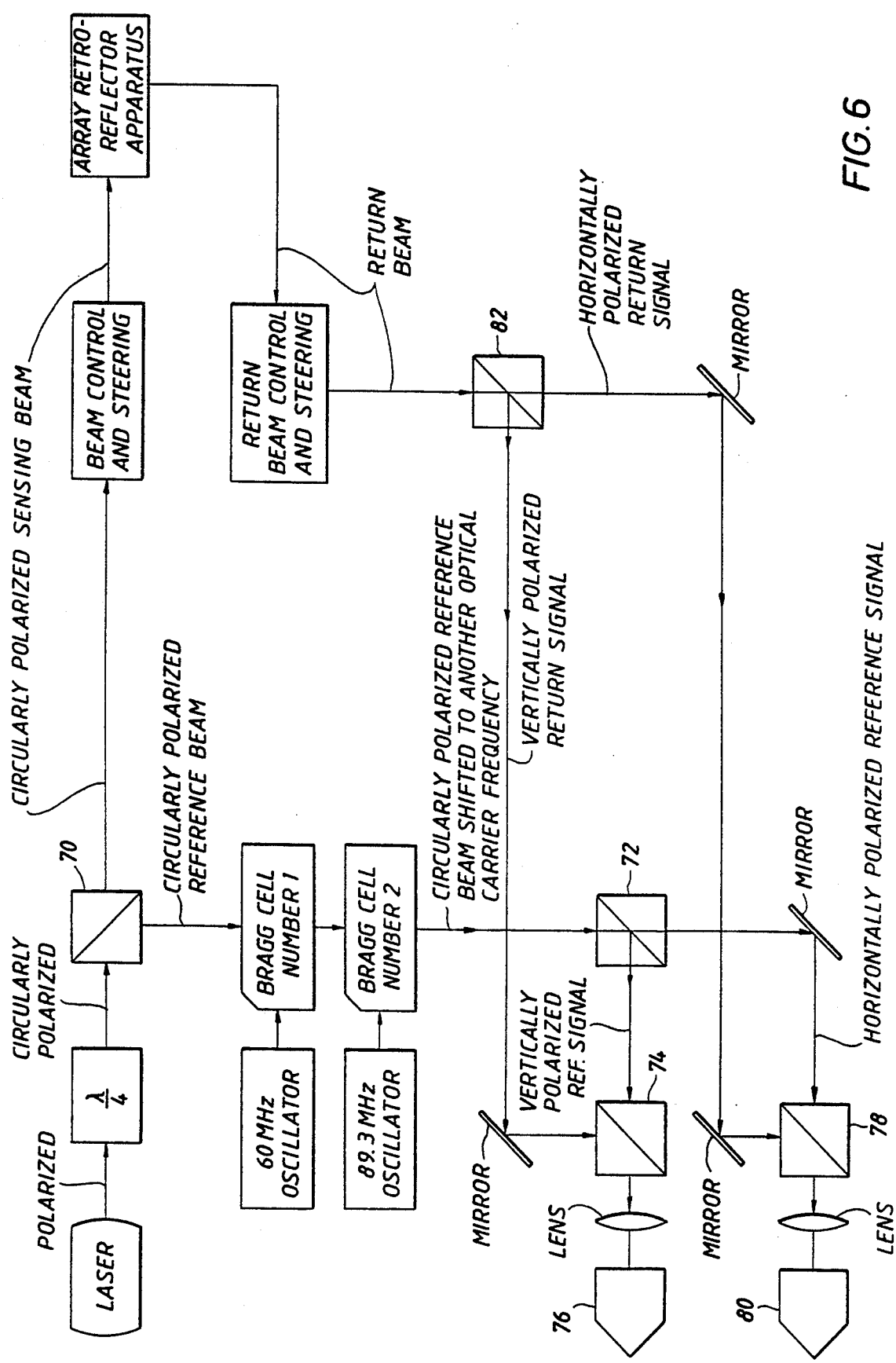
FIG. 6 is a simplified top view of an optical block diagram of the transmitting and receiving portion of one heterodyning embodiment of a laser differential mode LDI remote sensing system which transmits a circularly polarized sensing beam to the array retroreflector apparatus, the sensing system having two photodetector channels and reference beams for heterodyning with the sensing beams.
Figure 7:
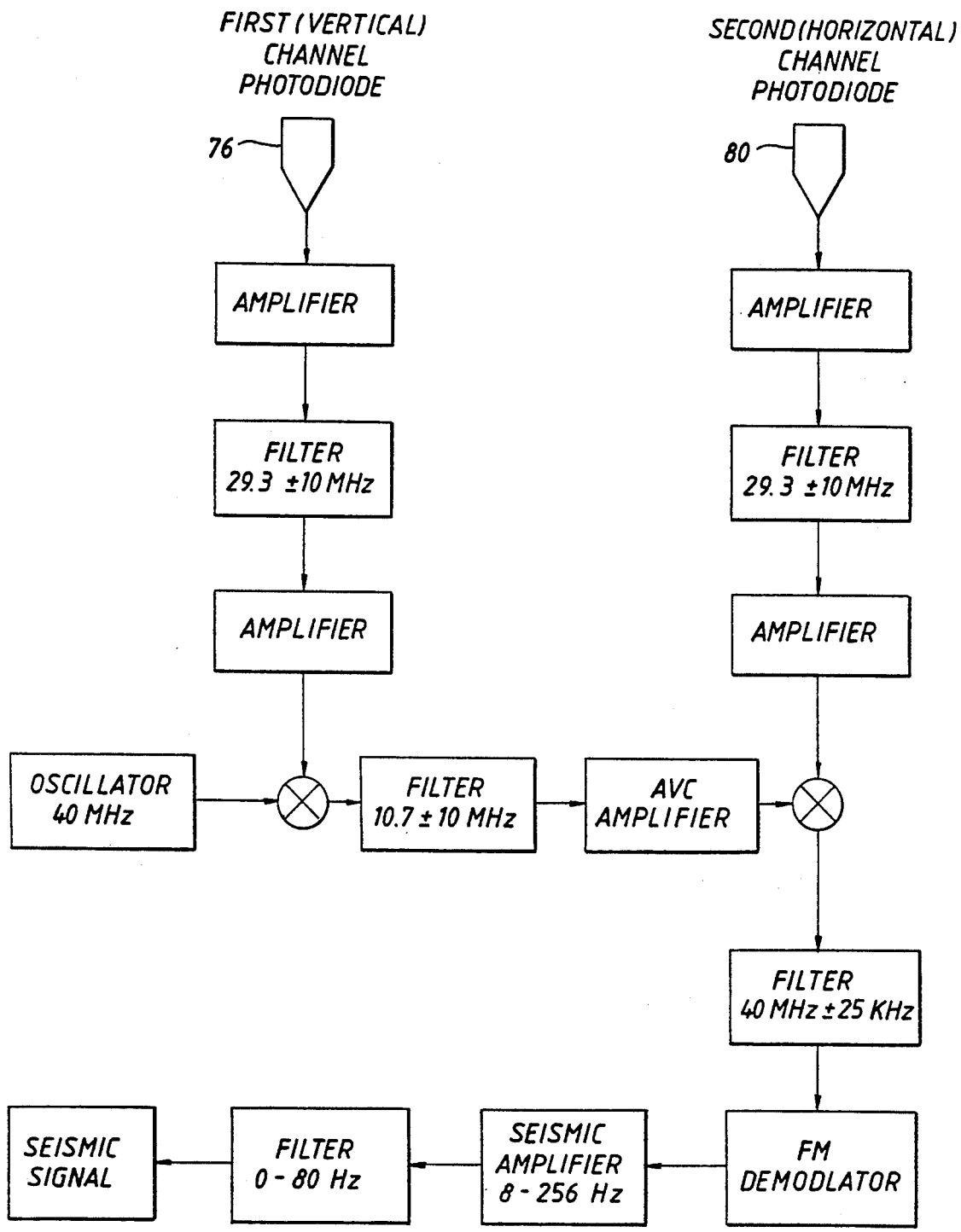
FIG. 7 is a block diagram of the electronic stages of the embodiment of the laser differential mode LDI of FIG. 6.

One preferred embodiment of the remote sensing system of this invention, which transmits a circularly polarized sensing beam, is shown in FIG. 6. FIG. 6 is a simplified "top view" optical block diagram of a Differential mode LDI system which uses reference signals in an optical heterodyning process to reduce the carrier frequency of the return sensing signals so that any frequency modulated components on the return sensing signals may be processed electronically. FIG. 7 is a simplified block diagram of the electronic stages which may be used with the optical stages of the preferred embodiment of FIG. 6 to heterodyne and demodulate the electrical signals.

Referring to FIG. 6, a linearly polarized beam is produced by a laser. The beam is oriented with and passed through a quarter-wave plate such that it becomes circularly polarized.

The beam then encounters a nonpolarizing beamsplitter 70 that divides the circularly polarized beam into a forward circularly polarized beam and a deflected circularly polarized beam. The forward beam is now referred to herein as a sensing beam. The sensing beam then enters a beam control and steering system which directs the sensing beam to an array retroreflector apparatus (target) of this invention. In some embodiments, a beam control and steering system may direct a plurality of transmitted beams to a plurality of targets at different detector stations. Returning to the nonpolarizing beamsplitter 70, the circularly polarized deflected beam will now be referred to herein as a reference beam. In this embodiment, the reference beam is frequency shifted by two cascaded Bragg cells. A Bragg cell is an acousto-optical modulator that shifts the impinging reference beam by the frequency of the applied oscillator signal. In this embodiment, the first Bragg cell shifts the reference beam by −60 MHz and the second Bragg cell shifts the reference beam by +89.3 MHz for a total frequency shift of +29.3 MHz.

It should be understood that the values of the frequencies provided in this discussion, as well as other frequencies discussed herein, are for an explanation of the particular embodiments described. Other frequencies may be used with these particular embodiments or similar embodiments of this invention.

After the second Bragg cell, the circularly polarized reference beam is split into two polarized signals, a first and a second reference signal, by a polarizing beamsplitter 72 (a first polarizing beamsplitter). The first reference signal will, in this explanation, be a vertically polarized reference signal and the second reference signal will be a horizontally polarized reference signal to correspond with the "top view" optical block diagram of FIG. 6. The polarizing beamsplitters 72 and 82 (a second polarizing beamsplitter) of FIG. 6 are oriented such that vertically polarized signals, which are separated from the reference or return beam (to be discussed herein later, are deflected).

The first sensing signal (the vertically polarized signal) is deflected within polarizing beamsplitter 72 and directed into nonpolarizing beamsplitter 74 which also has the function of a beam combiner. Within this nonpolarizing beamsplitter 74, a portion of the first reference signal is again deflected. At the output of beamsplitter 74, the deflected portion of the first sensing signal beam is focused by a lens onto a first channel photodiode 76 (a vertical channel photodiode).

Returning to polarizing beamsplitter 72, the second reference signal (the horizontally polarized signal) passes through this polarizing beamsplitter 72. The second reference signal is then reflected off a mirror into nonpolarizing beamsplitter 78 which also acts as a beam combiner. A portion of the second reference signal passes through beamsplitter 78 without being deflected. At the output of the beamsplitter 78, the undeflected portion of the second reference signal is focused by a lens onto a second channel photodiode 80 (a horizontal channel photodiode).

The sensing beam, as discussed previously, is converted by the target into two polarized return sensing signals, both of the return sensing signals having been frequency modulated, with the signals containing between then a difference signal which represents the array signal of the detector station. The return sensing signals are detected by the return beam control and steering system and passed to polarizing beamsplitter 82.

The return beam control and steering system and the sensing beam control and steering system in some embodiments could be integrated into a single component. As one component, a single (sensing and return) beam control and steering system could provide for directing and detecting a plurality of sensing beams and return sensing signals. The beam control and steering as a single component or as separate components may also be used to expand the sensing beams (beam spreading) for transmission and to compress the return sensing signals upon detection.

At polarizing beamsplitter 82, the two transversely polarized return sensing signals are sent in separate directions as a first return signal and a second return signal. In this embodiment, the first return signal is vertically polarized and the second return signal is horizontally polarized. The first return signal is deflected by beamsplitter 82 into a mirror. The first return signal is then reflected off the mirror into nonpolarizing beamsplitter 74 where a portion of the first return signal is deflected into a lens. The lens focuses the deflected portion of the first return signal such that it is superimposed over the first reference signal on the first channel photodiode 76. Both of the superimposed signals on the photodiode 76 are vertically polarized.

The second return signal passes through beamsplitter 82 and it is reflected off a mirror into nonpolarizing beamsplitter 78. A portion of the second return signal is deflected by beamsplitter 78 into a lens. The lens focuses the deflected portion of the second return signal such that it is superimposed over the second reference signal on the second channel photodiode 80. Both of the superimposed signals on the second channel photodiode 80 are horizontally polarized.

At photodiodes (photodetectors) 76 and 80, a process known as optical heterodyning takes place to produce an electrical channel signal from each photodetector. The outputs of photodiodes 76 and 80 are radio frequency (RF) signals (product signals) whose strength is proportional to the intensity of the incident light (the reference and return signals). The desired product signal, from each of the photodiodes 76, 80, of this embodiment of the invention, has a carrier frequency which is the photodiode difference frequency between the reference signals and the return sensing signals. In this embodiment, the photodiode difference frequency is 29.3 MHz for the RF signal from each photodiode 76, 80. This is the frequency shift placed on the reference beam by the cascaded Bragg cells. The RF signal from each photodiode has the Doppler shifted frequency components of the return sensing signal centered on the carrier frequency of 29.3 MHz. The first photodiode 76 provides an RF signal which has the Doppler shifted frequency components produced by the frequency modulation of one of the sensing signals at the target; and, the second photodiode 80 provides an RF signal which has the Doppler shifted frequency components produced by the frequency modulation of the other sensing signal at the target.

The cascaded Bragg cells are used in this embodiment to decrease the effects of an unwanted, contaminating signal. A small part (less than 0.1%) of the incident beam (the circularly polarized reference signal), still at the original laser frequency, leaks through the first Bragg cell. Without the second Bragg cell, the presence of this leakage beam may interfere with a return sensing signal at the photodetector because the polarized reference signal is usually considerably stronger than the return sensing signal.

In other embodiments, a second Bragg cell may not be necessary, especially if the return sensing signal is considerably stronger at the photodetector than the leakage reference signal from a single Bragg cell.

Referring now to FIG. 7, it shows in block diagram form the electronic stages of an embodiment which may be used to combine the first (vertical) channel signal with the second (horizontal) channel signal of this differential mode LDI embodiment to obtain a signal which represents the array signal of the detector station. The RF signals from the output of the vertical channel photodiode and the horizontal photodiode are amplified, then enter filters. The filters are centered at 29.3 MHz and are broad enough to accommodate any frequency modulation due to laser frequency jitter, air turbulence, laser platform motion and motions on the target. In this embodiment, the filters have a bandpass of 10 MHz on each side of the center frequency. These filters eliminate the Bragg cell leakage signals at 89.3 MHz and 60 MHz. At the output of the filters the signals are again amplified.

The first (vertical) channel signal is then multiplied by a 40 MHz oscillator signal in another heterodyning stage. This multiplication causes signals at the sum (69.3 MHz) and difference (10.7 MHz) frequencies. The difference frequency (10.7 MHz) is allowed to pass through a filter which is centered at 10.7 MHz and has a bandpass in this embodiment of 10 MHz on each side of the center frequency. Note that the taking of the difference frequency resulted in a polarity reversal for the carrier frequency and for the associated Doppler modulated components centered about the first (vertical) channel's carrier frequency. The resulting 10.7 MHz carrier signal out of the filter is amplified and then multiplied with the second (horizontal) channel output signal in an additional heterodyning stage to produce a sum signal. The second (horizontal) channel is still centered at 29.3; thus, the sum frequency of the first and second channel signals is 40 MHz for the sum signal.

In addition, because the polarity of the first (vertical) channel signal is reversed before being combined with the second (horizontal) channel signal, the sum signal will not include frequency components of the two signals which are substantially identical but of reverse polarity (the common mode signals in this stage), that is, the common mode signals are canceled electronically. Only the FM modulation from the target which represents the difference signal between the first and the second return sensing signals will remain centered on the 40 Mhz carrier. Any common modulation components (common mode signals) due to air turbulence, laser jitter, and in-line radar transmitter and target motion are eliminated. Ideally, only the Doppler modulation resulting from the array signal remains on the 40 MHz carrier. However, due to the different paths traveled by the sensing beams and the return sensing signal, some turbulent noise may also be on the difference signal.

The sum signal is passed through a 40 MHz quartz filter with a bandpass of 450 kHz on each side of the center frequency. When the array electrical signal is amplified by the amplifier, the amplified array signal may cause the transducer 36 to move the retroreflector (or beamsplitter) at a rate of 15 cm/sec or higher for the largest seismic motions detected by the geophones, so a maximum Doppler shift at the higher conventional laser frequencies would be around 450 kHz for the array signal. The smaller vertical motions on the casing, if used without amplification, would result in a Doppler shift of approximately 6.0 Hz on the carrier frequency of the laser, would, in this case, (due to amplification of the seismic signal), have a Doppler shift of approximately 180 Hz. Consequently, the amplification of the array signal, in this case, resulted in increasing the Doppler shift by a factor of 30. Greater increases are possible.

The FM demodulator converts the desired Doppler shifted signal (the difference signal) about the center frequency of the sum signal to a time varying signal (amplitude modulated signal) which represents the velocity of the ground motions at the remote location. The demodulated signal is then amplified with a constant gain over the frequency range of 8-256 Hz. It may then pass through a low pass filter with a frequency range of 0-80 Hz to produce the seismic signal which represents the velocities of the desired ground motions at the remote location, which in this case are the vertical ground motions. The time varying signal may be processed by techniques known in the art to reduce any turbulent noise on the seismic signal such as by stacking or other noise reduction processes.

Again, the bandwidths, the center frequencies of the filters used and the heterodyning frequencies used in this explanation may be changed in this or the other embodiment shown to other frequencies to achieve similar results. In addition, some amplification stages may be eliminated or moved to other stages in the FM demodulation process.

HETERODYNING DIFFERENTIAL MODE LDI WITH ONE PHOTODETECTOR CHANNEL

Referring now to FIG. 8, the figure shows a simplified "top view" optical block diagram of a bipolarized, differential mode, LDI remote sensing system which does not use reference signals in the optical heterodyning process and has a single photodetector channel. As described previously in a preferred embodiment, a single laser may be used to provide a linearly polarized beam which is shifted by a quarter-wave plate to obtain a circularly polarized sensing beam. The sensing beam may then be directed by a beam steering and control system to illuminate an array retroreflector apparatus (target).

The return sensing signals are detected by the return beam control and steering system. The return signals are then sent in different directions by polarizing beamsplitter 86 as a first return signal (a vertically polarized signal) and a second return signal (a horizontally polarized signal). The beamsplitter 86 in this orientation deflects the first return signal into a mirror. The mirror directs the first return signal into a Bragg cell.

In this embodiment, since the second return signal is not substantially stronger than the first return signal, the use of cascaded Bragg cells may not be necessary to reduce the Bragg cell leakage signal. The Bragg cell oscillator shifts the frequency of the impinging first return signal by 40 MHz. The frequency shifted first return signal is then reflected off a mirror into nonpolarizing beamsplitter 88 which also acts as a beam combiner. A portion of the frequency shifted first return signal is deflected by the nonpolarizing beamsplitter 88 into a lens. The deflected portion of the first return signal is focused by the lens onto a photodiode.

Referring again to polarizing beamsplitter 86, the second return signal passes through the polarizing beamsplitter 86 and enters a quarter-wave plate. The quarter-wave plate changes the polarity of the second return signal from horizontal polarization to vertical polarization. A portion of the second return signal then passes through nonpolarizing beamsplitter 88 (acting as a beam combiner) into the lens. The lens focuses the second return signal such that it overlaps the frequency shifted first return signal on the photodiode.

Both of the signals on the photodiode (photodetector) are now vertically polarized so optical heterodyning may take place at the photodiode. The output of the photodiode is a plurality of radio frequency (RF) signals (product signals) whose strength is proportional to the intensity of the incident light (the two return signals). The desired product signal from the photodiode of this embodiment has a carrier frequency which is the difference frequency between the second return signal and the frequency shifted first return signal. In this embodiment, the photodiode difference frequency is 40 MHz for the RF signal from the photodiode. This is the frequency shift placed on the first return signal by the Bragg cell. The RF signal from the photodiode has the array signal Doppler shifted frequency components centered about the carrier frequency of 40 MHz. The changing of the polarity of the second return signal by the quarter-wave plate into a vertically polarized signal enabled optical heterodyning to take place so that the common modulation components (common mode signals) of the two sensing signals would cancel in the photodetector; thus, common modulation components, such as, atmospheric turbulence, laser jitter, and in-line radar transmitter and target motion, are eliminated at the photodetector in this embodiment and a frequency modulated difference signal which represents the array signal remains.

FIG. 9 is a block diagram of the electronic stages of an embodiment which may be used in obtaining a seismic signal for the RF signal produced by the photodetector of FIG. 8. The RF signal is amplified, then passed thorough a 40 MHz filter with a bandpass of 450 kHz on each side of the center frequency of the filter. The signal is then FM demodulated to provide, ideally, a time varying signal representative of the velocity of the ground motions detected by the geophones at the detector station. This signal may then be amplified and filtered to provide a seismic trace, which in this example is a seismic signal detected by the array.

While several embodiments of the invention have been shown and described, it will be understood that the invention is not limited thereto since many modifications may be made and will become apparent to those of skill in the art.

What is claimed is:

1. A remote detector apparatus for use with a bipolarized, differential mode, laser differential, interferometry remote sensing system, said apparatus being located at a selected location and adapted to enable the remote sensing system to detect an electrical signal coupled to said remote detector apparatus, comprising:
    a casing, the casing being functional to couple motions at the selected location, the motions having directions of movement in any of three orthogonal directions; and
    a means for converting two sensing signals transmitted from the remote sensing system into two polarized return sensing signals, said means being mounted on the casing and having the electrical signal coupled thereto, said means being functional for frequency modulating both of the return sensing signals to contain frequency components that represent common motions coupled to the casing and to contain between the return signals a difference signal which represents the electrical signal.

2. The remote detector apparatus in accordance with claim 1, wherein the two sensing beams transmitted by the sensing system are approximately horizontal sensing beams, the sensing beams being a first sensing beam and a second sensing beam, and the means for converting the two sensing beams into two polarized return sensing signals includes:
    a mirror rigidly attached to the casing, the mirror being functional for reflecting the first sensing beam and the second sensing beam in a direction which is along a vertical ordinate, the mirror also being functional to move in response to the motions coupled to the casing, the mirror's movements in directions that are inline with a horizontal-inline ordinate and the vertical ordinate causing the two sensing beams to be frequency modulated by Doppler shifting each sensing beam to have a first grouping of frequency components;
    a first polarizer, said first polarizer being aligned along the vertical ordinate to encounter the first sensing beam and being functional to provide a first polarized sensing signal from said first sensing beam;
    a second polarizer, said second polarizer being aligned along the vertical ordinate to encounter the second sensing beam and being functional to provide a second polarized sensing signal from said second sensing beam, the first polarizer and the second polarizer being aligned with respect to each other such that the polarity of the first polarized sensing signal is orthogonal to the polarity of the second sensing signal;
    a first retroreflector, said first retroreflector being rigidly attached to the casing and being aligned with the vertical ordinate such that the first polarized sensing signal will enter the aperture of the first retroreflector, the first retroreflector being functional to reflect the first polarized sensing signal back to the mirror and to move in response to the plurality of motions coupled to the retroreflector through the casing, the retroreflector's movements that are inline with the vertical ordinate causing the first polarized sensing signal to be frequency modulated by Doppler shifting the first grouping of frequency components on said signal into a second grouping of frequency components;
    a transducer, said transducer being rigidly attached to the casing, the transducer also having a means for coupling the electrical signal to the transducer, the transducer being functional to transform the electrical signal into transducer motions having directions of movements inline with the vertical ordinate and to move in response to the motions on the casing;
    a second retroreflector, said second retroreflector being rigidly attached to the transducer and being aligned with the vertical ordinate such that the second polarized sensing signal will enter the aperture of the second retroreflector, the second retroreflector being functional to reflect the second polarized sensing signal back to the mirror and to move in response to the motions on the casing, the second retroreflector's movements that are inline with the vertical ordinate causing the second polarized sensing signal to be frequency modulated by Doppler shifting the first grouping of frequency components on said signal into a second grouping of frequency components;
    the mirror also being functional to reflect the first polarized sensing signal and the second polarized sensing signal onto return propagation paths, the first polarized sensing signal becoming a first return sensing signal when reflected to its return propagation path and the second polarized sensing signal becoming a second return sensing signal when reflected to its return propagation path, whereby, when reflecting the first polarized sensing signal and the second polarized sensing signal, the mirror's motions that are inline with the horizontal-inline ordinate and the vertical ordinate causing the first polarized sensing signal and the second polarized sensing signal to be frequency modulated by Doppler shifting the second grouping of frequency components on each said signal into a third grouping of frequency components, the third grouping of frequency components on the first return sensing signal representing the common motions, the third grouping of frequency components on the second return sensing signal including frequency components which represent the common motions, and the two return sensing signals having between them a difference signal which represents the electrical signal.

3. The remote detector apparatus in accordance with claim 2, wherein the first retroreflector is a corner-cube retroreflector and the second retroreflector is a corner-cube retroreflector.

4. The remote detector apparatus in accordance with claim 3, wherein the electrical signal coupled to the transducer is an amplified electrical signal.

5. The remote detector apparatus in accordance with claim 4, wherein the first polarizer is a wire grid polarizer and the second polarizer is a wire grid polarizer.

6. The remote detector apparatus in accordance with claim 3, wherein the motions coupled to the casing include ground motions and wind motions.

7. The remote detector apparatus in accordance with claim 6, wherein the selected location is a detector station and the electrical signal is an amplified array signal.

8. The remote detector apparatus in accordance with claim 7, wherein the means for coupling the array signal to the transducer includes:
- an array of connected geophones forming the detector station, said connected geophones being connected with a cable, the array being functional to provide a combined electrical signal representative of seismic motions detected by said geophones, the combined electrical signal being the array signal; and
- an amplifier, the array signal being coupled to the amplifier by the cable, the amplifier being functional to amplify the array signal to provide an amplified array signal, the cable also connecting the amplifier to the transducer thereby coupling the amplified array signal to the transducer.

9. The remote detector apparatus in accordance with claim 3, wherein the means for coupling the electrical signal to the transducer includes:
- an array of connected seismic detectors forming an array at the selected location, said connected seismic detectors being connected with cable, the array being functional to produce a combined electrical signal representative of seismic motions detected by said seismic detectors, the combined electrical signal being an array signal; and
- an amplifier, the amplifier being connected to the array by the cable and the cable also connecting the amplifier to the transducer, the amplifier being functional to amplify the combined electrical signal to produce an amplified array signal, the amplified array signal being the electrical signal.

10. The remote detector apparatus in accordance with claim 9 wherein the seismic detectors include hydrophones.

11. The remote detector apparatus in accordance with claim 9 wherein the seismic detectors include geophones.

12. The remote detector apparatus in accordance with claim 1, wherein the remote detection system is elevated above the selected location, the two sensing beams being a first sensing beam and a second sensing beam, and the means for converting the two sensing beams into two polarized return sensing signals includes:
- a means for deflecting the first sensing beam and the second sensing, the means for deflecting being functional to deflect the two sensing beams in a direction which is along a vertical ordinate;
- a first polarizer, said first polarizer being aligned along the vertical ordinate to encounter the first sensing beam and being functional to provide a first polarized sensing signal from said first sensing beam;
- a second polarizer, said second polarizer being aligned along the vertical ordinate to encounter the second sensing beam and being functional to provide a second polarized sensing signal from said second sensing beam, the first polarizer and the second polarizer being aligned with respect to each other such that the polarity of the first polarized sensing signal is orthogonal to the polarity of the second sensing signal;
- a first retroreflector, said first retroreflector being rigidly attached to the casing and being aligned with the vertical ordinate such that the first polarized sensing signal will enter the aperture of the first retroreflector, the first retroreflector being functional to reflect the first polarized sensing signal back to the means for deflecting and to move in response to the plurality of motions coupled to the retroreflector through the casing, the retroreflector's movements that are inline with the vertical ordinate causing the first polarized sensing signal to be frequency modulated by Doppler shifting said signal to include Doppler shifted frequency components which represent these vertical motions;
- a transducer, said transducer being rigidly attached to the casing, the transducer also having a means for coupling the electrical signal to the transducer, the transducer being functional to transform the electrical signal into transducer motions having directions of movements inline with the vertical ordinate and to move in response to the plurality of motions on the casing;
- a second retroreflector, said second retroreflector being rigidly attached to the transducer and being aligned with the vertical ordinate such that the second polarized sensing signal will enter the aperture of the second retroreflector, the second retroreflector being functional to reflect the second polarized sensing signal back to the means for deflecting and to move in response to the plurality of motions on the casing, the second retroreflector's movements that are inline with the vertical ordinate causing the second polarized sensing signal to be frequency modulated by Doppler shifting said signal to include Doppler shifted frequency components which represent these vertical motions;
- the means for deflecting also being functional for deflecting the first polarized sensing signal and the second polarized sensing signal onto return propagation paths, the first polarized sensing signal becoming a first return sensing signal when deflected to its return propagation path and the second polarized sensing signal becoming a second return sensing signal when deflected to its return propagation path, whereby, the first return sensing signal contains Doppler shifted frequency components which represent the common motions and the second return sensing signal contains Doppler shifted frequency components which include frequency components that represent the common motions, and the two return sensing signals have between them a difference signal which represents the electrical signal.

13. The remote detector apparatus in accordance with claim 12, wherein the first retroreflector is a corner-cube retroreflector and the second retroreflector is a corner-cube retroreflector.

14. The remote detector apparatus in accordance with claim 13, wherein the electrical signal coupled to the transducer is an amplified electrical signal.

15. The remote detector apparatus in accordance with claim 14, wherein the first polarizer is a wire grid polarizer and the second polarizer is a wire grid polarizer.

16. The remote detector apparatus in accordance with claim 13, wherein the motions coupled to the casing include ground motions and wind motions.

17. The remote detector apparatus in accordance with claim 16, wherein the selected location is a detector station and the electrical signal is an amplified array signal.

18. The remote detector apparatus in accordance with claim 16, wherein the means for coupling the array signal to the transducer includes:

an array of connected geophones forming the detector station, said connected geophones being connected with a cable, the array being functional to provide a combined electrical signal representative of seismic motions detected by said geophones, the combined electrical signal being the array signal; and an amplifier, the array signal being coupled to the amplifier by the cable, the amplifier being functional to amplify the array signal to provide an amplified array signal, the cable also connecting the amplifier to the transducer thereby coupling the amplified array signal to the transducer.

19. The remote detector apparatus in accordance with claim 14, wherein the means for deflecting the two sensing beams and the two return sensing signals is a wedge.

20. The remote detector apparatus in accordance with claim 14, wherein the means for deflecting the two sensing beams and the two return sensing signals is a lens.

21. The remote detector apparatus in accordance with claim 13, wherein the means for coupling the electrical signal to the transducer includes:

an array of connected seismic detectors forming an array at the selected location, said connected seismic detectors being connected with cable, the array being functional to produce a combined electrical signal representative of seismic motions detected by said seismic detectors, the combined electrical signal being an array signal; and an amplifier, the amplifier being connected to the array by the cable and the cable also connecting the amplifier to the transducer, the amplifier being functional to amplify the combined electrical signal to produce an amplified array signal, the amplified array signal being the electrical signal.

22. The remote detector apparatus in accordance with claim 21 wherein the seismic detectors include hydrophones.

23. The remote detector apparatus in accordance with claim 21 wherein the seismic detectors include geophones.

24. A method for producing transversely polarized, differential mode signals, said signals having a difference signal between them which represents an electrical signal produced at a remote location, said signals enabling a remote sensing, bipolarized, differential mode, laser differential interferometry system to detect the electrical signal, the method comprising the steps of:

(a) transmitting two adjacent and approximately parallel sensing beams to the remote location, the two sensing beams being a first sensing beam and a second sensing beam;

(b) coupling motions at the remote location to a casing;

(c) deflecting the first and second sensing beams to a first sensing path and a second sensing path, said sensing paths being adjacent and parallel;

(d) separating from the first sensing beam a first polarized sensing signal;

(e) separating from the second sensing beam a second polarized sensing signal, the polarity of the second sensing signal being orthogonal to the polarity of the first sensing signal, whereby the two polarized signals are transversely polarized;

(f) Doppler shifting the first sensing beam with some of the motions coupled to the casing while reflecting the first polarized sensing signal back along the first sensing path, the first polarized sensing signal containing Doppler shifted frequency components which represent casing motions which are inline with the first sensing path;

(g) transforming the electorial signal into movements which are inline with the second sensing path;

(h) Doppler shifting the second polarized sensing signal with some of the motions coupled to the casing and with the movements of the converted electrical signal and reflecting the second polarized sensing signal back along the second sensing path, the second polarized sensing signal containing Doppler shifted frequency components which represent the casing motions which are inline with the second sensing path and the movements of the converted electrical signal; and (i) deflecting the first polarized sensing signal and the second polarized sensing signal onto return propagation paths which take the transversely polarized signals back to the remote sensing system, the two signals containing between them a difference signal which represents the electrical signal.

25. The method according to claim 24, wherein in step (c) the sensing beams are deflected such that the first sensing path and the second sensing path are along a vertical ordinate.

26. The method according to claim 25, wherein:

in step (a) the transmitted sensing beams are approximately horizontal sensing beams at the remote location;

step (c) also includes Doppler shifting the sensing beams with some of the motions coupled to the casing while deflecting the beams by reflecting them to their first sensing path and their second sensing path, the casing motions that Doppler shift the beams being the motions which having directions of movement inline with the vertical ordinate and a horizontal-inline ordinate; and step (i) also includes Doppler shifting the first polarized sensing signal and the second polarized sensing signal with some of the motions coupled to the casing while deflecting the beam by reflecting them to their return propagation paths, the casing motions that Doppler shift the polarized sensing signals being the casing motions having directions of movement inline with the vertical ordinate and a horizontal-inline ordinate, whereby the bipolarized sensing signals include frequency components on each said signal which represent common motions, thereby each said signal contains a common mode signal.

27. The method according to claim 24 wherein step (g) also includes:

producing the electrical signal by combining seismic signals obtained from an array of seismic detectors at the remote location to produce an array signal and amplifying the array signal to provide an amplified array signal, the amplified array signal being the electrical signal.

28. A remote sensing apparatus for detecting an electrical signal produced at a selected location by using bipolarized, differential mode, laser differential interferometry, comprising:

a laser, the laser being functional for producing a laser beam of substantially monochromatic frequency;

a beamsplitter, the beamsplitter being functional for splitting the laser beam into a sensing beam and a reference beam;

a first Bragg cell, the Bragg cell being functional for changing the frequency of the reference beam to produce a frequency offset between the frequency of the sensing beam and the frequency of the reference beam;

a first polarizing beamsplitter, the first polarizing beamsplitter being functional for splitting the reference beam into two polarized reference signals, a first reference signal and a second reference signal, the polarity of the first reference signal being orthogonal to the polarity of the second reference signal;

a casing, the casing being functional to couple to motions at the selected location;

a means mounted on the casing which is functional for converting two adjacent portions of the sensing beam into two transversely polarized, return sensing signals, each said return sensing signal having common mode frequency components which represent common motions on the casing and the two signals have between them a difference signal which represents the electrical signal, said means separating the return sensing signal from the two portions of the sensing beam such that the polarities of said two return sensing signal are orthogonal with respect to each other, said means transforming the electrical signal into movements which Doppler shift one of the two return sensing beams, and said means also utilizing some of the motions coupled to the casing to contribute common mode Doppler shifted frequency components to both polarized return sensing signal;

a return beam detector, the return beam detector being functional for detecting the two return sensing signals;

a second polarizing beamsplitter, the second polarizing beamsplitter being functional for deflecting the return sensing signals onto separate paths, thereby one of the return sensing signals becoming a first return signal and another of the return sensing signals becoming a second return signal, the polarity of the first return signal being orthogonal to the polarity of the second return signal and having the same polarity as the first reference signal;

a first photodetector, the first photodetector being functional for combining in an optical heterodyning process the first reference signal with the first return signal to produce a first channel signal having a center frequency approximately at the frequency offset;

a second photodetector, the second photodetector being functional for combining in an optical heterodyning process the second reference signal with the second return signal to produce a second channel signal having a center frequency approximately at the frequency offset, the first channel signal and the second channel signal being two channel signals;

an oscillator, the oscillator being functional to produce a signal having a frequency which when heterodyned with one of the two channel signals reverses the polarity of the channel signal and shifts the channel signal frequency;

a means for combining the oscillator signal with said one of the two channel signals to produce a polarity reversed channel signal;

a means for combining the polarity reversed channel signal with a remaining channel signal of the two channel signals in a heterodyning process to cancel any common mode signals that were on the two polarized return sensing signals, the means for combining also producing a frequency modulated difference signal which represents the electrical signal.

29. The remote sensing apparatus of claim 28, also including, an FM demodulator to produce a time varying signal which represents the electrical signal.

30. The remote sensing apparatus of claim 29, wherein the time varying signal is a seismic trace, the apparatus also including:

an array of connected seismic detectors forming an array at the selected location, said connected seismic detectors being connected with cable, the array being functional to produce a combined electrical signal representative of seismic motions detected by said seismic detectors, the combined electrical signal being an array signal; and an amplifier, the amplifier being connected to the array by the cable and the cable also connecting the amplifier to the transducer, the amplifier being functional to amplify the combined electrical signal to produce an amplified array signal, the amplified array signal being the electrical signal.

31. A method for detecting an electrical signal produced at a selected location using bipolarized, differential mode, laser differential interferometry, comprising the steps of:

(a) producing a laser beam of substantially monochromatic frequency;

(b) splitting the laser beam into a sensing beam and a reference beam;

(c) changing the frequency of the reference beam to produce a frequency offset between the frequency of the sensing beam and the frequency of the reference beam;

(d) splitting the reference beam into two polarized reference signals, a first reference signal and a second reference signal, the polarity of the first reference signal being orthogonal to the polarity of the second reference signal;

(e) directing the sensing beam to the selected location;

(f) coupling motions at the selected location to a casing;

(g) converting two adjacent portions of the sensing beam at the casing into two transversely polarized, return sensing signals, each return sensing signal having common mode signals which represents common motions on the casing and the two return sensing signals having a difference signal between them which represents the electrical signal by separating the two polarized sensing signals from the two portions of sensing beam, said two sensing signals having polarities which are orthogonal with respect to each other, by transforming the electrical signal into movements which Doppler shift one of the return sensing signals, and by utilizing some the motions on the casing to contribute Doppler shifted frequency components to the two polarized return sensing signals, the Doppler shifted frequency components contributed by casing motions being the common mode signals;

(h) detecting the two return sensing signals;

(i) deflecting the two return sensing signals into separate paths, thereby one of the two return sensing signals becoming a first return signal and another return sensing signal becoming a second return signal, the polarity of the first return signal being orthogonal to the polarity of the second return signal and having the same polarity as the first reference signal;

(j) combining in an optical heterodyning process the first reference signal with the first return signal and the second reference signal with the second return signal to produce a first channel signal and a second channel signal, each channel signal having a center frequency approximately at the offset frequency;

(k) reversing the polarity of either channel signal;

(l) canceling the common mode signals that were on the two return sensing signals by combining a reversed channel signal with a remaining channel signal in a heterodyning process to produce a frequency modulated difference signal; and (m) demodulating the deference signal to produce a time varying signal which represents the electrical signal.

32. The method for obtaining a difference signal according to claim 31, wherein:

step (g) also includes, producing seismic signals by connecting seismic detectors with a cable to form an array, combining the seismic signals to form an array signal and amplifying the array signal with an amplifier to produce an amplified array signal, the amplified array signal being the electrical signal; and in step (m), the time varying signal is a seismic trace.

33. A remote sensing apparatus for detecting an electrical signal produced at a selected location using bipolarized, differential mode, laser differential interferometry, comprising:

a laser, the laser being functional for producing a laser beam of substantially monochromatic frequency;

a casing, the casing being functional to couple to motions at the selected location;

a means mounted on the casing which is functional for converting two adjacent portions of the sensing beam into two transversely polarized, return sensing signals, each said return sensing signal having common mode frequency components which represent common motions on the casing and the two signals have between them a difference signal which represents the electrical signal, said means separating the return sensing signal from the two portions of the sensing beam such that the polarities of said two return sensing signal are orthogonal with respect to each other, the means transforming the electrical signal into movements which Doppler shift one of the two return sensing beams, and the means also utilizing some of the motions coupled to the casing to contribute common mode Doppler shifted frequency components to both polarized return sensing signal;

a return sensing signal detector, the return sensing signal detector being functional for detecting the two return sensing signals;

a polarizing beamsplitter, the polarizing beamsplitter being functional for deflecting the return sensing signals onto separate paths, thereby one of the return sensing signals becoming a first return signal and another of the return sensing signals becoming a second return signal, the polarity of the first return signal being orthogonal to the polarity of the second return signal;

a means for changing the frequency of the first return signal to produce a frequency offset between the frequency of the first return signal and the second return signal;

a means for rotating the polarity of the second return signal such that it has the same polarity as the first return signal; and a photodetector, the photodetector being functional for combining in an optical heterodyning process the first return signal with the second return signal to cancel any common mode signals which were on the two return sensing signals and to produce a channel signal having a center frequency approximately at the frequency offset, the channel signal being the frequency modulated difference signal which represents the electrical signal.

34. The remote sensing apparatus of claim 33, wherein the means for changing the frequency of the first return signal is a Bragg cell.

35. The remote sensing apparatus of claim 33, wherein the means for rotating the polarity of the second return signal is a quarter-wave plate.

36. The remote sensing apparatus of claim 33, wherein the time varying signal is a seismic trace, the apparatus also including:

an array of connected seismic detectors forming an array at the selected location, said connected seismic detectors being connected with cable, the array being functional to produce a combined electrical signal representative of seismic motions detected by said seismic detectors, the combined electrical signal being an array signal; and an amplifier, the amplifier being connected to the array by the cable and the cable also connecting the amplifier to the transducer, the amplifier being functional to amplify the combined electrical signal to produce an amplified array signal, the amplified array signal being the electrical signal.

37. A method for detecting an electrical signal produced at a selected location using bipolarized, differential mode, laser differential interferometry, comprising the steps of:

(a) producing a laser beam of substantially monochromatic frequency;

(b) directing the sensing beam to the selected location;

(c) coupling motions at the selected location to a casing;

(d) converting two adjacent portions of the sensing beam at the casing into two transversely polarized, return sensing signals, each return sensing signal having common mode signals which represents common motions on the casing and the two return sensing signals having a difference signal between them which represents the electrical signal by separating the two polarized sensing signals from the two portions of sensing beam, said two sensing signals having polarities which are orthogonal with respect to each other, by transforming the electrical signal into movements which Doppler shift one of the return sensing signals, and by utilizing some the motions on the casing to contribute Doppler shifted frequency components to the two polarized return sensing signals, the Doppler shifted frequency components contributed by casing motions being the common mode signals;

(e) detecting the two return sensing signals;

(f) deflecting the two return sensing signals into separate paths, thereby one of the two return sensing signals becoming a first return signal and another return sensing signal becoming a second return signal, the polarity of the first return signal being orthogonal to the polarity of the second return signal;

(g) changing the frequency of the first return signal to produce a frequency offset between the frequency of the first return signal and the frequency of the second return signal;

(h) reversing the polarity of the second return signal;

(i) canceling any common mode signals that may have been on the two return sensing signals by combining in an optical heterodyning process the first return signal with the second return signal to produce a channel signal, the optical heterodyning producing a frequency modulated difference signal which represents the electrical signal;

(j) demodulating the deference signal to produce a time varying signal which represents the electrical signal.

38. The method for detecting an electrical signals of claim 37, wherein:

step (d) also includes, producing seismic signals by connecting seismic detectors with a cable to form an array, combining the seismic signals to form an array signal and amplifying the array signal with an amplifier to produce an amplified array signal, the amplified array signal being the electrical signal; and in step (j), the time varying signal is a seismic trace.

* * * * *